United States Patent
Abe et al.

(10) Patent No.: US 6,921,476 B2
(45) Date of Patent: Jul. 26, 2005

(54) UV-ASSISTED ADVANCED-OZONATION WATER TREATMENT SYSTEM AND ADVANCED-OZONATION MODULE

(75) Inventors: Norimitsu Abe, Kanagawa-Ken (JP); Setsuo Suzuki, Kanagawa-Ken (JP); Seiichi Murayama, Kanagawa-Ken (JP); Kotaro Iyasu, Tokyo (JP); Kie Kubo, Kanagawa-Ken (JP); Kenji Taguchi, Kanagawa-Ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 10/644,015

(22) Filed: Aug. 20, 2003

(65) Prior Publication Data

US 2004/0045886 A1 Mar. 11, 2004

(30) Foreign Application Priority Data

Sep. 11, 2002 (JP) ........................................ 2002-265463

(51) Int. Cl.$^7$ ................................................. C02F 1/32
(52) U.S. Cl. ...................... 210/96.1; 210/134; 210/192; 210/199; 210/202; 210/748; 422/186.3; 422/186.08
(58) Field of Search ................................. 210/199, 202, 210/205, 220, 748, 96.1, 134, 192; 422/186.08, 186.12, 186.3; 250/431

(56) References Cited

FOREIGN PATENT DOCUMENTS

JP          61249589 A   *   11/1986   ............. C02F/1/32

* cited by examiner

Primary Examiner—Duane Smith
Assistant Examiner—Douglas J Theisen
(74) Attorney, Agent, or Firm—Finnegan, Henderson, Farabow, Garrett & Dunner, L.L.P.

(57) ABSTRACT

A UV-assisted advanced-ozonation water treatment system comprises a water treating tank 1, an ozonic water tank 2, an ozonized gas generator 3, and a UV light source 4 disposed in the water treating tank 1 and having a UV-radiating surface 4a, and an ozonic water jetting device including jetting nozzles 5 for jetting the ozonic water onto the UV-radiating surface of the UV light source. An ozonized gas diffusing device 12 is placed in the ozonic water tank 2. An ozonized gas generated by the ozonized gas generator 3 and compressed by a compressor 13 at a pressure in the range of about 2 to about 3 kg/cm$^2$ is diffused into the ozonic water tank 2 by the ozonized gas diffusing device 12. A high-pressure, a high-ozone-concentration ozonic water produced in the ozonized water tank 2 is jetted through the jetting nozzles 5 onto the UV-radiating surface 4a.

17 Claims, 16 Drawing Sheets

UV-ASSISTED ADVANCED-OZONATION WATER TREATMENT SYSTEM AND ADVANCED-OZONATION MODULE

BACKGROUND OF THE INVENTION

1. Field of the Invention

The present invention relates to a UV-assisted advanced-ozonation water treatment system using ozone and UV light. More particularly, the present invention relates to a UV-assisted advanced-ozonation water treatment system using ozone and UV light for the purification of raw water to produce clear water, secondary sewage, industrial waste water, industrial waste, seepage through a landfill or such, and an advanced-ozonation module.

2. Description of the Related Art

The pollution of water by industrial wastewater and sewage has progressively grown worse in recent years, and environmental water pollution has become a significant social problem. It is indicated that water in the upper reaches of rivers, which are sources of clear water, contains hardly decomposable pollutants such as agricultural chemicals, dioxins and environmental hormones, in small concentrations. The pollution of lower reaches of rivers is more serious; lower reaches of rivers are polluted with various chemical substances including organic chloride detergents, agricultural chemicals, synthetic detergents and dyes. The pollution of seepage from landfills containing industrial and domestic wastes is in an extremely serious condition. Active efforts are being made for the development of environmental water conservation techniques. Efforts have been made for the development of techniques for activated carbon treatments, membrane processes, ozonation treatments and biological treatments. An advanced oxidation process (hereinafter abbreviated to "AOP") using UV light, hydrogen peroxide, or a combination of UV light and hydrogen peroxide is a promising comprehensive process. FIG. 27 is a block diagram of assistance in explaining the advanced-oxidation process. Referring to FIG. 27, an advanced-oxidation water treatment system includes a water treating tank 51, a UV light source 54, a power supply 55 for supplying power to the UV light source 54, an ozone generator 56, an ozonized gas diffusing device 50 and a discharged-ozone decomposer 58. An ozonized gas is diffused in bubbles by the ozonized gas diffusing device 50 into water contained in the water treating tank 51. Then, the ozonized gas dissolves in the water. When the water containing the ozonized gas is irradiated with UV light, radical species having oxidizing power higher than that of ozone are produced in the water, and the radical species decompose hard-to-decompose substances that could not be decomposed by ozone. The advanced oxidation water treatment using ozone and UV light in combination is capable of achieving efficient decomposition, has improved deodorizing, decolorizing and sterilizing functions and is capable of achieving water purifying treatment without secondary waste.

Although the advanced-oxidation water treatment system shown in FIG. 27 purifies water effectively, pollutants to be decomposed cannot efficiently be decomposed if the quantity of ozone diffused into the water or the quantity of UV light emitted by the UV light source becomes insufficient due to the variation of the quality of the water being treated. If surplus ozone 57 is diffused into the water, the ozonized gas not dissolved in the water and remaining in the water treating tank needs to be decomposed by the discharged-ozone decomposer 58 and increases load on the discharged-Ozone decomposer 58. If a surplus quantity of UV light is emitted, the UV light source 54 consumes power uselessly and reduces the overall energy efficiency of the advanced-oxidation water treatment system. Organic substances and inorganic substances contained in the water adhere to the surface the UV-radiating wall of the UV light source 54 and reduce the UV transmittance of the UV-radiating wall. Consequently, the efficiency of decomposing pollutants contained in the water is reduced. Work necessary to clean the surface of the UV-radiating wall increases load the maintenance of the advanced-oxidation water treatment system.

If raw water to be treated contains seawater or an effluent containing ions of bromides that comes from a photographic plant, it is possible that bromic acid, which is a carcinogenic substance, is produced when the water is treated only by the advanced oxidation process using ozone and UV light in combination.

SUMMARY OF THE INVENTION

The present invention has been made in view of such problems and it is therefore an object of the present invention to improve the efficiency of decomposing pollutants contained in raw water through the improvement of radical species producing efficiency, to reduce load on maintenance by preventing the adhesion of pollutants to the surface of the UV light source, to reduce the size of a water treatment system, and to provide a UV-assisted advanced-ozonation water treatment system capable of operating at a low cost, and an advanced-ozonation module.

According to a first aspect of the present invention, a UV-assisted advanced-ozonation water treatment system comprises: a water treating tank having a water inlet connected to a water supply line for supplying water to be treated; an ozonic water tank for producing ozonic water; an ozonized gas generator for supplying an ozonized gas into the ozonic water tank; a UV light source disposed in the water treating tank and having a UV-radiating surface; and an ozonic water jetting device for jetting the ozonic water supplied from the ozonic water tank onto the UV-radiating surface of the UV light source.

According to the present invention, the ozone-containing water is jetted directly onto the UV-radiating surface, and pollutants contained in the water to be treated are oxidized by large quantities of radical species produced in the vicinity of the UV-radiating surface. Thus, the water to be treated can efficiently be purified and the adhesion of organic substances and inorganic substances to the UV-radiating surface of the UV light source can be prevented by the ozonic water jetted onto the UV-radiating surface.

In the UV-assisted advanced-ozonation water treatment system according to the present invention, the ozonic water jetting device includes jetting nozzles, and the ozonic water supplied from the ozonic water tank is jetted through the jetting nozzles onto the UV-radiating surface.

In the UV-assisted advanced-ozonation water treatment system according to the present invention, a water supply pipe having an open bottom is disposed in the water treating tank, the water to be treated is supplied into the water supply pipe through an upper part thereof, and the UV light source and the ozonic water jetting device are disposed in the impure water supply pipe.

According to the present invention, ozone containing water is jetted directly onto the UV-radiating surface of the UV light source and the pollutants contained in the water to be treated are oxidized by large quantities of radical species produced in the vicinity of the UV-radiating surface. Thus, the impure water can efficiently be purified. The pollutants that could not be decomposed in the water supply pipe are oxidized by ozone or radical species while the water to be treated discharged from the water supply pipe flows upward from the bottom of the water treating tank, which increases the efficiency of the water purifying process, uses ozone effectively, reduces the amount of waste ozone, and reduces discharged-ozone processing cost.

In the UV-assisted advanced-ozonation water treatment system according to the present invention, an ozonized gas diffusing device is disposed in a lower part of the water treating tank, residual ozonized gas not dissolved in water and accumulated in an upper part of the ozonic water tank is supplied into the ozonized gas diffusing device and is diffused into the water treating tank.

According to a second aspect of the present invention, a UV-assisted advanced-ozonation water treatment system comprises: a water treating tank having a water inlet connected to a water supply line for supplying water to be treated; an ozonic water tank for producing ozonic water; an ozonized gas generator for supplying an ozonized gas into the ozonic water tank; and advanced-ozonation modules disposed in the water treating tank, each including a cylindrical jacket with a side wall defining a substantially straight passage extending upward from a lower part of the water treating tank, a UV light source disposed in the cylindrical jacket and having a UV-radiating surface, and an ozonic water jetting device penetrating the side wall of the cylindrical jacket; wherein ozonic water is supplied from the ozonic water tank into the ozonic water jetting devices, and the ozonic water jetting devices jet the ozonic water onto the UV-radiating surfaces of the UV light sources.

In the UV-assisted advanced-ozonation water treatment system according to the present invention, the interior of the water treating tank is divided into an ozonization chamber and an advanced-ozonation chamber by a partition plate, the water to be treated is supplied into an upper part of the ozonization chamber, an ozonized gas diffusing device is disposed in a lower part of the ozonizing chamber, the advanced-ozonation modules are disposed in the advanced-ozonation chamber, the residual ozonized gas not dissolved in water and accumulated in an upper part of the ozonic water tank or the ozonized gas remaining in an upper part of the advanced-ozonation chamber, or both are supplied into the ozonized gas diffusing device to diffuse the ozonized gas into the ozonizing chamber.

In the UV-assisted advanced-ozonation water treatment system according to the present invention, the water treating tank is formed by connecting an ozonizing tank and an advanced-ozonation tank by a connecting pipe, the water to be treated is supplied into an upper part of the ozonization tank, an ozonized gas diffusing device is disposed in a lower part of the ozonizing tank, the advanced-ozonation module is disposed in the advanced-ozonation tank, the residual ozonized gas not resolved in water and accumulated in an upper part of the ozonic water tank or the ozonized gas accumulated in an upper part of the advanced-ozonation tank, or both are supplied into the ozonized gas diffusing device to diffuse the ozonized gas into the ozonizing tank.

In the UV-assisted advanced-ozonation water treatment system according to the present invention, the advanced-ozonation tank includes a plurality of advanced-ozonation tanks, the advanced-ozonation modules are disposed in each of the advanced-ozonation tanks, the plurality of advanced-ozonation tanks are connected to the ozonizing tank by connecting pipes, respectively, and the connecting pipes are provided with shutoff valves, respectively.

In the UV-assisted advanced-ozonation water treatment system according to the present invention, a hydrogen peroxide injecting device is connected to the impure water supply line connected to the water inlet of the water treating tank.

The UV-assisted advanced-ozonation water treatment system according to the present invention may further comprise a flow meter placed in the water supply line connected to the water inlet of the water treating tank; and an arithmetic unit that controls the flow rate of the ozonic water flowing from the ozonic water tank into the ozonic water jetting device, and the intensity of UV light radiated by the UV light sources according to the difference between a reference flow rate and a measured flow rate measured by the flow meter.

According to the present invention, the flow rate of the water is measured and the flow rate of the ozonic water and/or the intensity of the UV light radiated by the UV light source is controlled according to the variation of the flow rate of the impure water. Therefore, the flow rate of the ozonic water and/or the intensity of the UV light radiated by the UV light source can properly be controlled according to the variation of the flow rate to ensure reliable water treatment, useless power consumption by the ozonized gas generator and the UV light source can be prevented, and energy efficiency can be improved.

The UV-assisted advanced-ozonation water treatment system according to the present invention may further comprise a UV transmittance measuring means connected to the water supply line connected to the water inlet to measure UV transmittance of the water to be treated; and an arithmetic unit that controls flow rate of the ozonic water flowing from the ozonic water tank into the ozonic water jetting device or ozone concentration of the ozonized gas generated from the ozonized gas generator, or both, and the intensity of ultraviolet radiation radiated by the UV light source, or both according to difference between a reference UV transmittance and a measured UV transmittance measured by the UV transmittance measuring means.

According to the present invention, the intensity of the UV radiation radiated by the UV light source is increased when the measured UV transmittance drops below the reference UV transmittance to maintain an effective UV-irradiated range in the water treating tank, or the flow rate of the ozonic water is increased to increase ozone concentration in the vicinity of the UV-radiating surface to increase the production of radical species, and ozonic water jetting force is increased to enhance water to be treated stirring force for stirring the impure water in the water treating tank to compensate for the reduction of the purifying performance due to the narrowing of the effective UV-irradiated range.

If the measured UV transmittance is higher than the reference UV transmittance, the production of necessary radical species can be ensured by reducing the intensity of the UV radiation radiated by the UV light source to maintain the effective UV-irradiated range in the water treating tank or by reducing ozonic water jetting rate to expand the effective UV-irradiated range. Thus, useless power consumption by the UV light source and the ozonized gas generator can be prevented. The rate of changing the intensity of UV radiation and the rate of changing ozonic water jetting rate are determined according to the difference between the reference UV transmittance and the measured UV transmittance of the water to be treated such that the sum of the respective power consumptions of the UV light source and the ozonized gas generator is a minimum. Thus the optimum control of the flow rate of the ozonic water and the intensity of the UV radiation is achieved, reliable water treatment is possible, useless power consumption by the ozonized gas generator and the UV light source is prevented, and energy efficiency can be improved.

The UV-assisted advanced-ozonation water treatment system according to the present invention may further comprise a water quality measuring means placed in the water supply line connected to the water inlet to measure the quality of the impure water; and an arithmetic unit that controls the flow rate of the ozonic water flowing from the ozonic water tank into the ozonic water jetting device or the ozone concentration of the ozonized gas generated by the ozonized gas generator, or both, and the intensity of UV radiation radiated by the UV light source according to difference between a reference water quality and a measure water quality measured by the impure water quality measuring means.

According to the present invention, the intensity of UV radiation radiated by the UV light source is reduced to narrow an effective UV-irradiated region in the water treating tank of ozonic water jetting rate is reduced if the difference between a reference water quality and a measured water quality decreases. Thus, the ozone concentration of the ozonic water in the vicinity of the UV-radiating surface is reduced to reduce the production of radical species to avoid useless power consumption by the UV light source and the ozonized gas generator if the load on the quality of the impure water decreases.

If the difference between a reference water quality and a measured water quality increases, the intensity of UV radiation radiated by the UV light source is increased to maintain/expand the effective UV-irradiated region in the water treating tank or ozonic water jetting rate is increased. Thus, the ozone concentration of the ozonic water in the vicinity of the UV-radiating surface is increased to increase the production of radical species and the force of ozonic water jetted through the jetting nozzles is increased to increase stirring force for stirring the impure water in the water treating tank. The rate of changing the intensity of UV radiation and the rate of changing ozonic water jetting rate are determined according to the difference between the reference water quality and the measured water quality measured by the water quality measuring means such that the sum of the respective power consumptions of the UV light source and the ozonized gas generator is a minimum. Thus the optimum control of the ozonic water jetting rate and the intensity of the UV radiation is achieved, reliable water treatment is possible, useless power consumption by the ozonized gas generator and the UV light source is prevented, and energy efficiency can be improved.

The UV-assisted advanced-ozonation water treatment system may further comprise a clean water quality measuring means placed in a clean water carrying line connected to a water outlet of the water treating tank to measure the quality of purified clean water; and an arithmetic unit that controls the flow rate of the ozonic water flowing from the ozonic water tank into the ozonic water jetting device or the ozone concentration of the ozonized gas generated by the ozonized gas generator, or both, and the intensity of UV radiation radiated by the UV light source according to the difference between a reference water quality and a measure clean water quality measured by the clean water quality measuring means.

The UV-assisted advanced-ozonation water treatment system according to the present invention may further comprise: a flow meter placed in the water supply line connected to the water inlet of the water treating tank; a UV transmittance measuring means placed in the water supply line connected to the water inlet of the water treating tank; a clean water quality measuring means for measuring quality of purified clean water placed in a clean water carrying line connected to a water outlet of the water treating tank; and an arithmetic unit that controls the intensity of UV radiation radiated by the UV light source according to the a reference flow rate and a measured flow rate measured by the flow meter and the difference between difference between a reference UV transmittance and a measured UV transmittance measured by the UV transmission measuring device, and controls the flow rate of the ozonic water flowing from the ozonic water tank into the ozonic water jetting device or ozone concentration of the ozonized gas generated by the ozonized gas generator, or both according to the difference between a reference clean water quality and a measured clean water quality measured by the clean water quality measuring means.

The UV-assisted advanced-ozonation water treatment system according to the present invention may further comprise a dissolved-ozone concentration meter placed in the water treating tank; and an arithmetic unit that controls the flow rate of the ozonic water flowing from the ozonic water tank into the ozonic water jetting device or the ozone concentration of the ozonized gas generated by the ozonized gas generator, or both according to the difference between a reference dissolved-ozone concentration and a measured dissolved-ozone concentration measured by the dissolved-ozone concentration meter, and adjusts the intensity of UV radiation radiated by the UV light source to a predetermined value.

The UV-assisted advanced-ozonation water treatment system according to the present invention may further comprise a bromide ion concentration measuring means for directly or indirectly measuring bromide ion concentration placed in the water supply line on the upper side of the hydrogen peroxide injecting device; and an arithmetic unit that increases hydrogen peroxide injecting rate and reduces intensity of UV radiation radiated by the UV light sources according the difference between a reference bromide concentration and a measured bromide ion concentration measured by the bromide ion concentration measuring means when the measured bromide ion concentration rises beyond the reference bromide ion concentration, and reduces hydrogen peroxide injecting rate and increases intensity of UV radiation radiated by the UV light sources according to the difference between a reference bromide ion concentration and a measured bromide ion concentration measured by the bromide ion concentration measuring means when the measured bromide ion concentration drops below the reference bromide ion concentration.

According to the present invention, the hydrogen peroxide injecting rate is increased according to the rate of increase of the difference between the measured bromide ion concentration measured by the bromide ion concentration measuring means and the reference bromide ion concentration because the risk of bromic acid production increases with the increase of the bromic ion concentration of the impure water.

On the other hand, the hydrogen peroxide injecting rate is decreased according to the rate of decrease of the difference between the measured bromide ion concentration measured by the bromide ion concentration measuring means and the reference bromide ion concentration because the risk of bromic acid production decreases with the decrease of the bromic ion concentration of the impure water.

According to a third aspect of the present invention, an advanced-ozonation module comprises: a cylindrical jacket defining a substantially straight passage; a UV light source having a UV-radiating wall having a UV-radiating surface; and an ozonic water jetting device including jetting nozzles penetrating the side wall of the cylindrical jacket.

BRIEF DESCRIPTION OF THE DRAWINGS

The above and other objects, features and advantages of the present invention will become more apparent from the following description taken in connection with the accompanying drawings, in which.

DESCRIPTION OF THE PREFERRED EMBODIMENTS

First Embodiment

Figure 1:
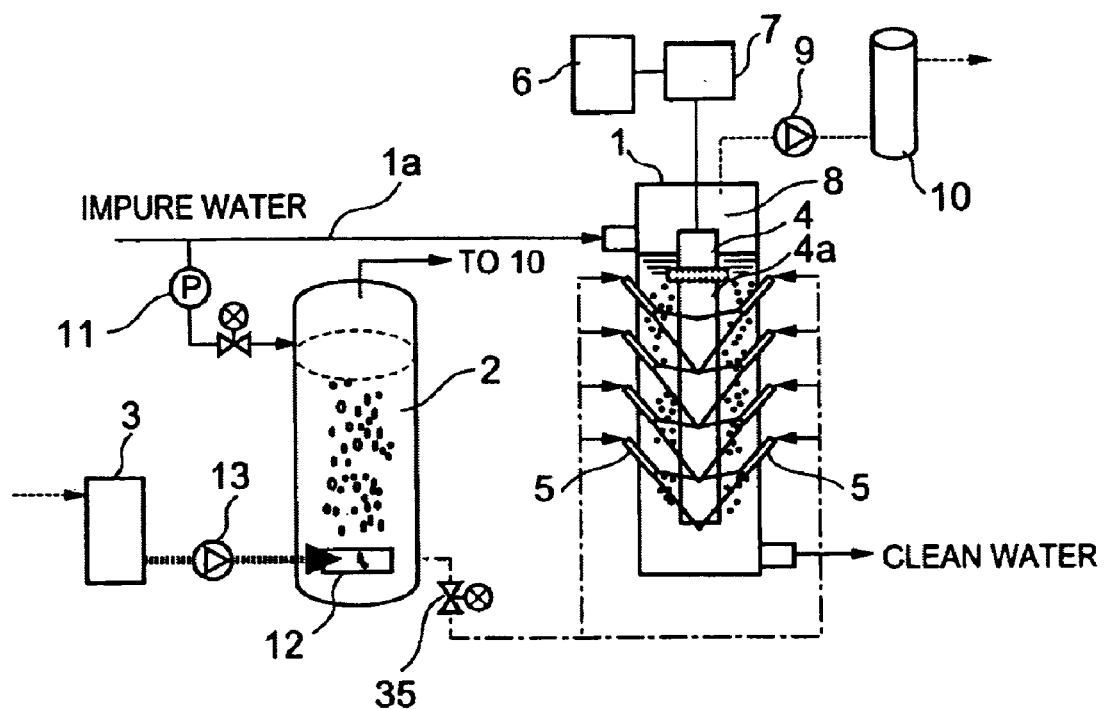
FIG. 1 is a diagrammatic view of a UV-assisted advanced-ozonation water treatment system in a first embodiment according to the present invention.

Referring to FIG. 1 showing a UV-assisted advanced-ozonation water treatment system in a first embodiment according to the present invention, the UV-assisted advanced-ozonation water treatment system comprises a water treating tank 1 having a water inlet connected to an impure water supply line (wafer supply line) 1a, an ozonic water tank 2 for producing ozonic water, an ozonized gas generator 3 for supplying an ozonized gas into the ozonic water tank 2, and a UV light source 4 disposed in the water treating tank 1 and having a UV-radiating surface 4a. Jetting nozzles 5 for jetting ozonic water are arranged around the UV light source 4 to jet ozonic water supplied from the ozonic water tank 2 onto the UV-radiating surface 4a of the UV light source 4. Impure water (wafer to be treated) supplied through the impure water supply line 1a into the water treating tank 1 flows downward. The ozonic water is jetted through the jetting nozzles 5 in directions perpendicular to or at an angle to the flow of the ozonic water in the water treating tank 1. The jetting nozzles 5 are attached to walls of the water treating tank 1.

A UV power supply 6 and a UV light modulator 7 are connected to the UV light source 4. Preferably, the UV light source 4 is a mercury lamp having a UV-radiating surface 4a and capable of radiating UV radiation having the highest intensity at a wavelength of 253.7 nm. Residual ozonized gas, i.e., ozonized gas not consumed in the impure water, accumulates in an upper space 8 in the water treating tank 1. The accumulated residual ozonized gas is sent into a discharged ozone decomposer 10 by a blower 9. The discharged ozone decomposer 10 decomposes the residual ozonized gas into harmless gases and discharges the harmless gasses into the atmosphere.

A pump 11 pumps part of the impure water into an upper part of the ozonic water tank 2 preferably at a pressure in the range of about 2 to about 3 kg/cm². An ozonized gas diffusing device 12 is disposed in a lower part of the ozonic water tank 2. An ozonized gas generated by the ozonized gas generator 3 is compressed by a compressor 13 at a pressure in the range of about 2 to about 3 kg/cm², and the compressed ozonized gas is diffused by the ozonized gas diffusing device 12 into the impure water contained in the ozonic water tank 2. Then, the ozonized gas dissolves in the impure water and high-pressure, high-concentration ozonic water is produced. The high-pressure, high-concentration ozonic water produced in the ozonic water tank 2 is supplied through a flow regulating valve 35 to the jetting nozzles 5.

In the UV-assisted advanced-ozonation water treatment system thus constructed, the high-pressure, high-concentration ozonic water is jetted through the jetting nozzles 5 onto the UV-radiating surface 4a of the UV light source 4. Consequently, many radical species, such as OH radicals, having oxidizing power higher than that of ozone are produced at a high rate in the vicinity of the UV-radiating surface 4a. OH radicals are produced by the following reactions.

$$O_3 + hv \rightarrow O_2 + O^*(1D)$$

$$O^*(1D) + H_2O \rightarrow 2HO, \text{ or}$$

$$O_3 + H_2O + hv \rightarrow O_2 + H_2O_2$$

$$H_2O_2 + hv \rightarrow 2OH$$

where his Planck constant, v is the frequency of UV radiation, and O*(1D) indicates the excited state of oxygen atoms.

The OH radicals produced in the ozonic water oxidizes pollutants contained in the impure water efficiently and the water purifying process can very efficiently be achieved. The cleaning force of jets of the ozonic water jetted through the jetting nozzles 5 prevents the adhesion of organic substances to the UV-radiating surface 4a.

Figure 2:
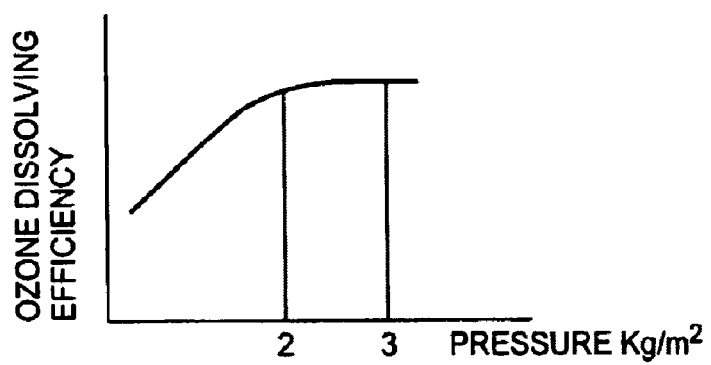
FIG. 2 is a graph showing the dependence of the efficiency of dissolution of ozonized gas in water on pressure.

FIG. 2 is a graph showing the dependence of ozone dissolving efficiency on the pressure in the ozonic water tank 2. Ozone dissolving efficiency saturate at when the pressure in the ozonic water tank 2 is in the range of about 2 to about 3 kg/cm². Thus, a high-pressure, high-concentration ozonic water can efficiently be produced when the interior of the ozonic water tank 2 is pressurized at a pressure in the range of about 2 to about 3 kg/cm².

The UV-assisted advanced-ozonation water treatment system in the first embodiment according to the present invention is capable of decomposing pollutants contained in the impure water more efficiently than the conventional diffusion type UV-assisted advanced-ozonation water treatment system, and of efficiently purifying the impure water. The UV-assisted advanced-ozonation water treatment system of the present invention, as compared with the conventional diffusion type UV-assisted advanced-ozonation water treatment system, reduces the amount of the ozonized gas not dissolved in the impure water and discharged outside, dissolves the ozonized gas satisfactorily in the impure water to use the ozonized gas effectively. Since the ozonic water produced by dissolving the ozonized gas in the impure water is jetted onto the UV-radiating surface 4a, where the intensity of UV radiation is the highest, the aforesaid reactions are promoted and increased quantities of OH radicals can be produced. Thus, the pollutants contained in the impure water can effectively be decomposed by the thus produced OH radicals. Organic and inorganic substances that contaminate the UV-radiating surface 4a are prevented from adhering to the UV-radiating surface 4a by the strong oxidizing effect of the OH radicals and the impulsive force of the jets of the ozonic water jetted through the jetting nozzles 5. Consequently, the life of the UV light source 4 is extended significantly and hence the costs of ozone generation and water treatment can be reduced.

Second Embodiment

A UV-assisted advanced-ozonation water treatment system in a second embodiment according to the present invention will be described with reference to FIG. 3, in which parts like or corresponding to those of the first embodiment shown in FIG. 1 are denoted by the same reference characters and the description thereof will be omitted.

Figure 3:
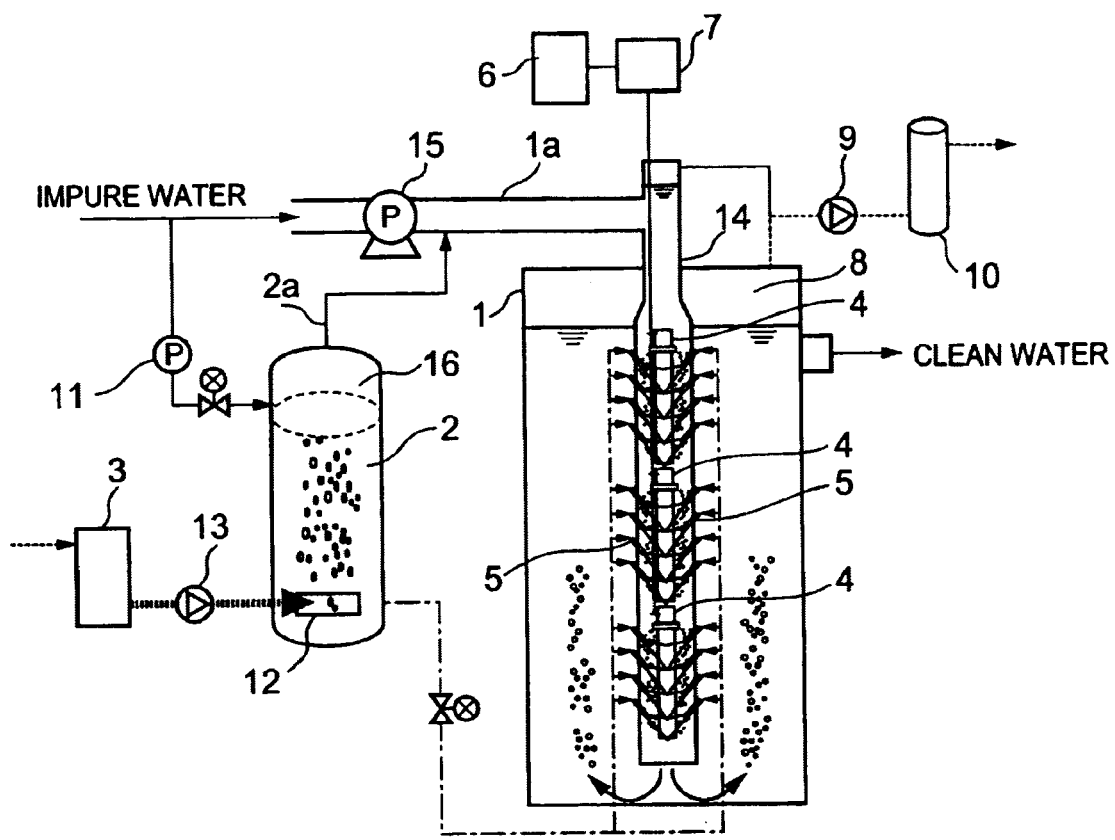
FIG. 3 is a diagrammatic view of a UV-assisted advanced-ozonation water treatment system in a second embodiment according to the present invention.

Referring to FIG. 3, an impure water conducting pipe 14 is disposed in a vertical position in a water treating tank 1 provided with a water inlet and a water outlet respectively connected to an impure water supply line 1a and a clean water delivery line 1b. An open lower end of pipe 14 is positioned near the bottom of the water treating tank 1. A plurality of UV lamps (UV light sources) 4 are arranged in a vertical arrangement in the impure water supply pipe 14. A plurality of jetting nozzles 5 are attached to the wall of the impure water conducting pipe 14 with their nozzle exits directed toward the UV-radiating surfaces 4a of the UV lamps 4 to jet an ozonic water supplied from an ozonic water tank 2 directly onto the UV-radiating surfaces 4a. An impure water pump 15 pumps the impure water through the impure water supply line 1a connected to an upper part of the impure water conducting pipe 14 into the impure water conducting pipe 14.

A residual ozonized gas that could not be dissolved in water in the ozonic water tank 2 accumulates in an upper space 16 in the ozonic water tank 2. The residual ozonized gas is injected through a connecting line 2a into the impure water supply line 1a to use the same for decomposing pollutants contained in the impure water. The impure water that flows upward from the lower end of the impure water conducting pipe 14 consumes the ozonic water or the ozonized gas that has not been exhausted in the impure water conducting pipe 14. Thus, substantially all the ozonized gas generated by an ozone generator 2 can be used effectively.

The high-pressure, high-concentration ozonic water is jetted through the jetting nozzles 5 toward the UV-radiating surfaces 4a. Consequently, large quantities of radical species, such as OH radicals, having high oxidizing power are produced at a high rate in the vicinity of the UV-radiating surfaces 4a where the intensity of UV radiation is the highest, and thereby the pollutants contained in the impure water can efficiently be decomposed.

The UV-assisted advanced-ozonation water treatment system in the second embodiment according to the present invention is capable of decomposing pollutants contained in the impure water more efficiently than the conventional diffusion type UV-assisted advanced-ozonation water treatment system, and of efficiently purifying the impure water. Organic and inorganic substances that contaminate the UV-radiating surfaces 4a are prevented from adhering to the UV-radiating surfaces 4a by the impulsive force of the jets of the ozonic water jetted through the jetting nozzles 5. Consequently, the life of the UV lamps 4 is extended significantly and hence the costs of ozone generation and water treatment can be reduced.

Third Embodiment

A UV-assisted advanced-ozonation water treatment system in a third embodiment according to the present invention will be described with reference to FIG. 4, in which parts like or corresponding to those of the first embodiment shown in FIG. 1 are denoted by the same reference characters and the description thereof will be omitted.

Figure 4:
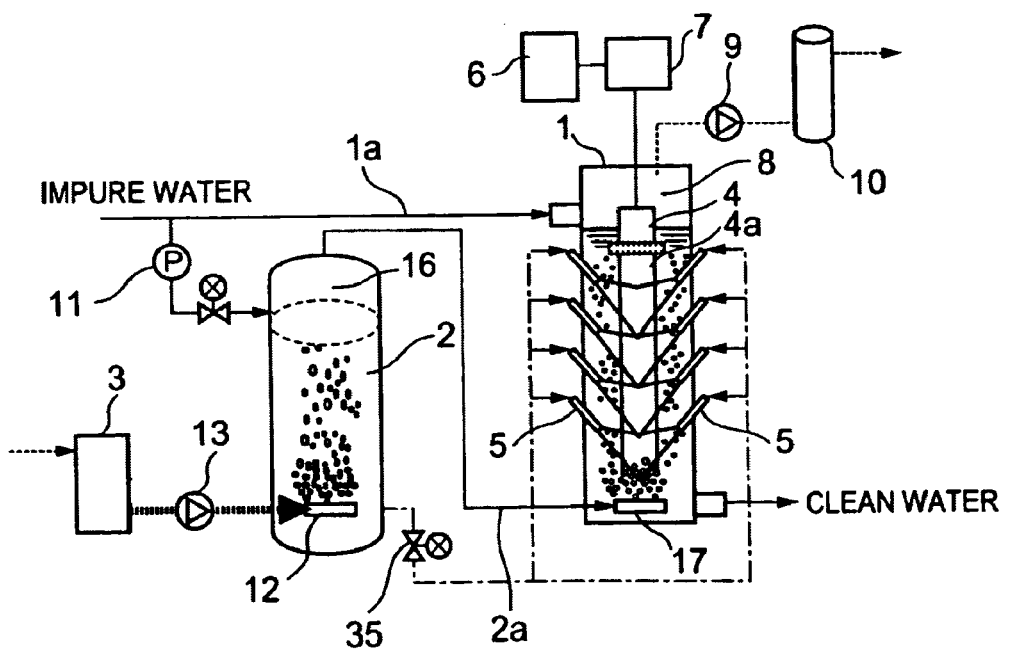
FIG. 4 is a diagrammatic view of a UV-assisted advanced-ozonation water treatment system in a third embodiment according to the present invention.

Referring to FIG. 4, an ozonized gas diffusing device 17 is disposed in a lower part of a water treating tank 1. A residual ozonized gas not dissolved in water and accumulated in an upper space 16 in an ozonic water tank 2 is supplied through an ozonized gas supply line 2a to the ozonized gas diffusing device 17 and is diffused into the water treating tank 1.

The UV-assisted advanced-ozonation water treatment system in the third embodiment according to the present invention is capable of decomposing pollutants contained in the impure water more efficiently than the conventional diffusion type UV-assisted advanced-ozonation water treatment system, and of effectively preventing the contamination of the UV-radiating surface 4a of a UV light source 4. Consequently, the life of the UV light sources 4 is extended significantly. Since the residual ozonized gas not dissolved in water in the ozonic water tank 2 is diffused by the ozonized gas diffusing device 17, the ozonized gas generated by the ozonized gas generator 3 is used effectively. Thus, the costs of ozone generation and water treatment can be reduced.

Fourth Embodiment

Figure 5:
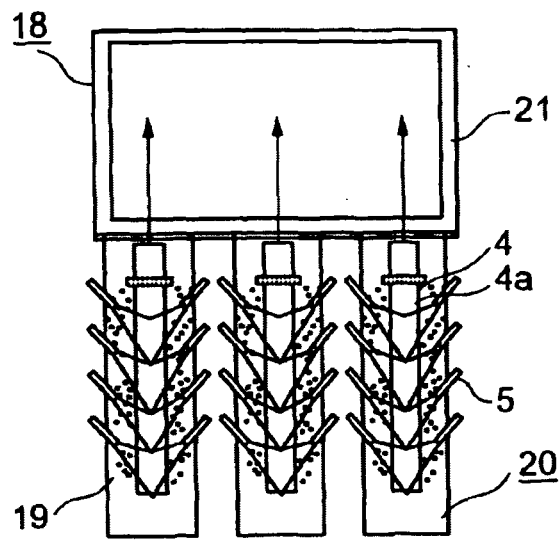
FIG. 5 is a diagrammatic view of an advanced-ozonation module according to the present invention.

A UV-assisted advanced-ozonation water treatment system in a fourth embodiment according to the present invention will be described with reference to FIGS. 5 and 6, in which parts like or corresponding to those of the first embodiment shown in FIG. 1 are denoted by the same reference characters and the description thereof will be omitted.

The UV-assisted advanced-ozonation water treatment system in the fourth embodiment is provided in a water treating tank 1 with six advanced-ozonation modules 18 instead of UV lamps (V light sources) 4. Referring to FIG. 5, each of the advanced-oxidation modules 18 includes a stationary frame 21, and three UV-irradiation tubes 20 fastened to the stationary frame 21 in a vertical, parallel arrangement. Each of the UV-irradiation tubes 20 includes a vertical, cylindrical jacket 19, a UV lamp (UV light source) 4 contained in the cylindrical jacket 19, and a plurality of jetting nozzles 5 penetrating the wall of the cylindrical jacket 19.

Figure 6:
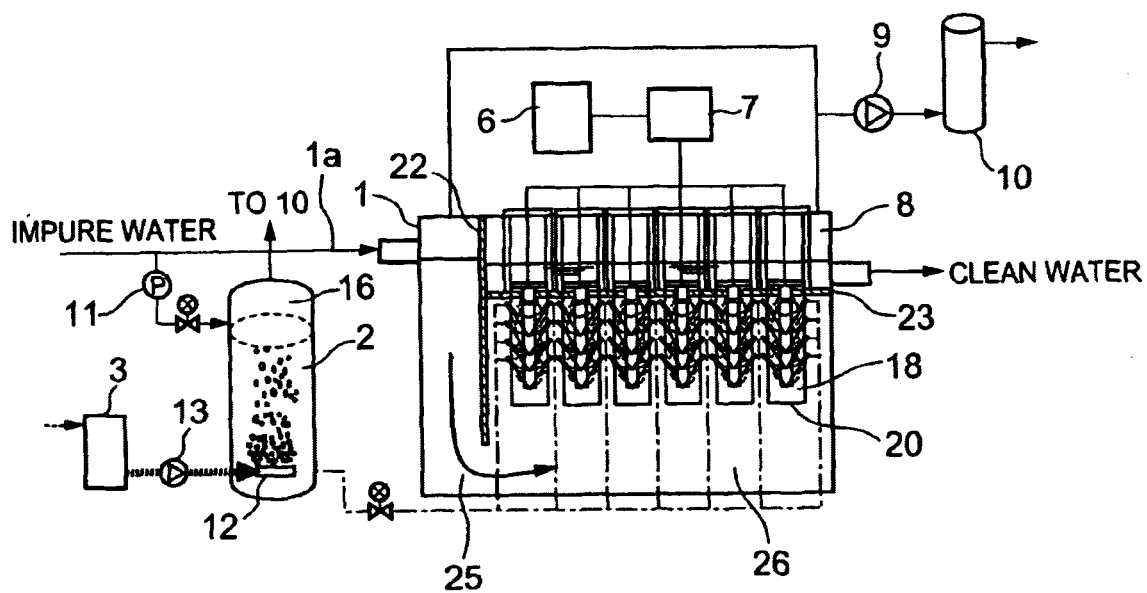
FIG. 6 is a diagrammatic view of a UV-assisted advanced-ozonation water treatment system in a fourth embodiment according to the present invention.

Referring to FIG. 6, the interior of the water treatment tank 1 is divided into an upstream chamber (ozonation chamber) 25 and a downstream chamber (advanced-ozonation chamber) 26 by a vertical partition plate 22 having a lower end spaced from the bottom of the water treating tank 1. The downstream chamber 26 is divided by a horizontal partition wall 23 into an upper part and a lower part. The horizontal partition wall 23 is provided with openings, and the advanced-ozonation modules 18 are fitted in the openings of the horizontal partition wall 23, respectively. Thus, impure water flows necessarily through the UV-irradiation tubes 20.

Ozonic water is supplied from an ozonic water tank 2 and is jetted onto the UV-radiating surfaces 4a of the UV lamps 4 through the jetting nozzles of the advanced-ozonation modules 18.

The advanced-oxidation modules 18 each provided with the three UV-irradiation tubes 20 can easily be attached to the horizontal partition wall 23, which facilitate the construction of a large-capacity UV-assisted advanced ozonation water treatment system. If the advanced-ozonation module 18 malfunctions or the UV lamps 4 need to be replaced, only the relevant advanced-ozonation module 18 is removed from the water treatment tank 1 to repair the advanced-ozonation module 18 or to replace the UV lamps 4 with new ones, which facilitates the maintenance of the UV-assisted advanced-ozonation water treatment system.

The UV-assisted advanced-ozonation water treatment system in the fourth embodiment according to the present invention is capable of decomposing pollutants contained in the impure water more efficiently than the conventional diffusion type UV-assisted advanced-ozonation water treatment system and of efficiently purifying the impure water. Organic and inorganic substances that contaminate the UV-radiating surfaces 4a are prevented from adhering to the UV-radiating surfaces 4a by the strong oxidizing effect of the impulsive force of the jets of the ozonic water jetted through the jelling nozzles 5. Consequently, the life of the UV lamps (UV light sources) 4 is extended significantly. Water treatment cost and maintenance cost can be reduced considerably because the UV-assisted advanced-ozonation water treatment system can easily be maintained.

Fifth Embodiment

A UV-assisted advanced-ozonation water treatment system in a fifth embodiment according to the present invention will be described with reference to FIG. 7, in which parts like or corresponding to those of the fourth embodiment shown in FIG. 6 are denoted by the same reference characters and the description thereof will be omitted.

Figure 7:
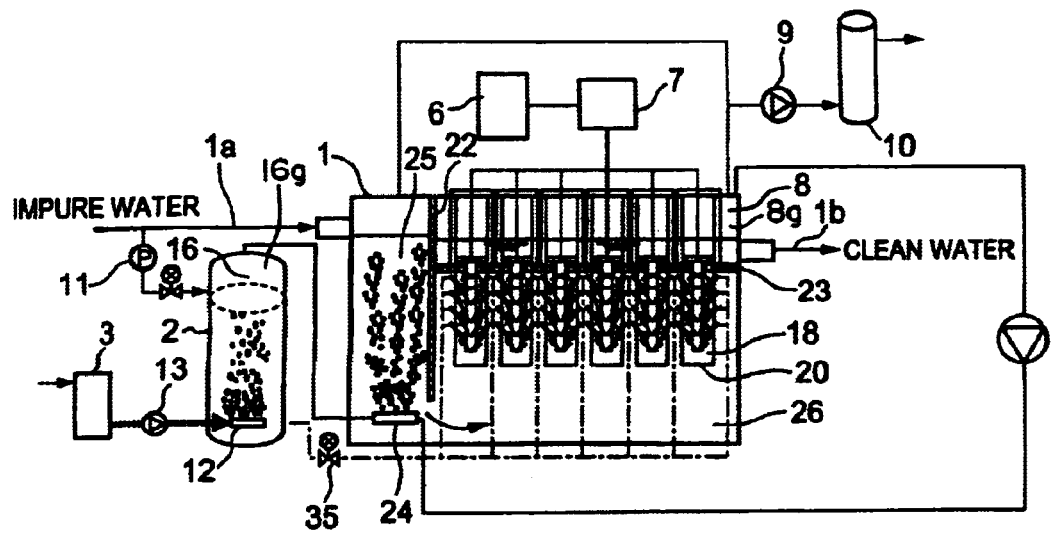
FIG. 7 is a diagrammatic view of a UV-assisted advanced-ozonation water treatment system in a fifth embodiment according to the present invention.

Referring to FIG. 7, the interior of a water treatment tank 1 is divided into an upstream chamber (ozonation chamber) 25 and a downstream chamber (advanced-ozonation chamber) 26 by a vertical partition plate 22 having a lower end spaced from the bottom of the water treating tank 1. Impure water is supplied into an upper part of the ozonation chamber 25. An ozonized gas diffusing device 24 is disposed in a lower part of the ozonation chamber 25, and advanced-ozonation modules 18 are disposed in the advanced-ozonation chamber 26.

A mixture of a residual ozonized gas 16g accumulated in an upper space 16 in an ozonic water tank 2 and a residual ozonized gas 8g accumulated in an upper space 8 in the advanced-ozonation chamber 26 is supplied to the ozonized gas diffusing device 24. Ozonic water is supplied from the ozonic water tank 2 to jetting nozzles 5 included in the advanced-ozonation modules 18 and is jetted onto the surfaces of UV lamps 4 contained in UV-irradiation tubes 20 included in the advanced-ozonation modules 18.

When the residual ozonized gas not dissolved in water in the ozonic water tank 2 and the residual ozonized gas not exhausted in the advanced-ozonation chamber 26 are collected and are supplied into the ozonizing chamber 25 for the preparatory treatment of the impure water prior to advanced-ozonation of the impure water. Therefore, the load on the advanced-ozonation chamber 26 is reduced and hence the quantity of the ozonic water to be supplied to the advanced-ozonation modules 18 can be reduced. Consequently, costs of ozone generation and water treatment can be reduced.

Sixth Embodiment

A UV-assisted advanced-ozonation water treatment system in a sixth embodiment according to the present invention will be described with reference to FIG. 8, in which parts like or corresponding to those of the fifth embodiment shown in FIG. 7 are denoted by the same reference characters and the description thereof will be omitted.

Figure 8:
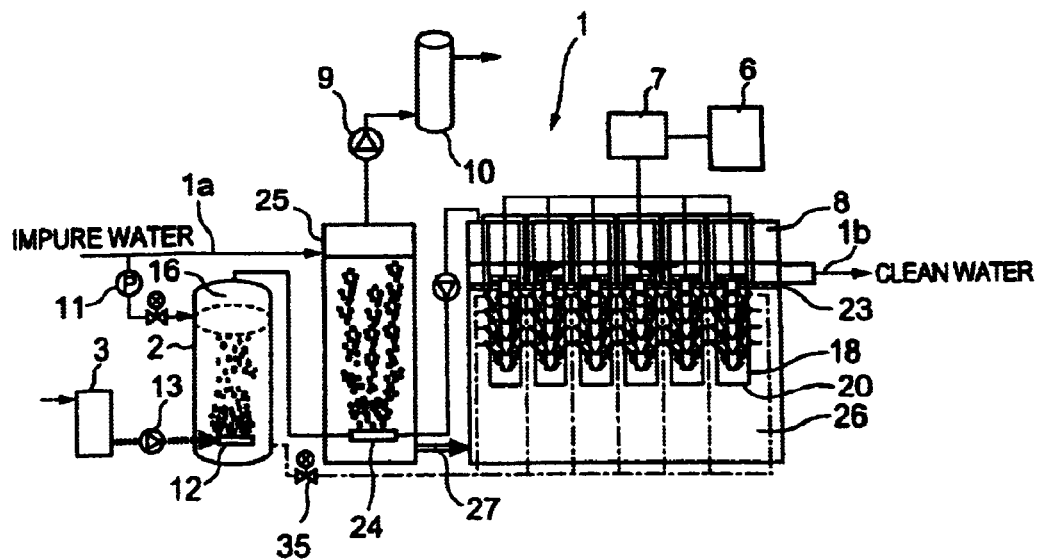
FIG. 8 is a diagrammatic view of a UV-assisted advanced-ozonation water treatment system in a sixth embodiment according to the present invention.

As shown in FIG. 8, the UV-assisted advanced-ozonation water treatment system in the sixth embodiment is provided with an ozonation tank 25 and an advanced-ozonation tank 26. A connecting line 27 connects the ozonation tank 25 to the advanced-ozonation tank 26.

Since the ozonation tank 25 and the advanced-ozonation tank 26 are provided separately, an existing water treatment system can easily be modified to construct a UV-assisted advanced-ozonation water treatment system by additionally installing the advanced-ozonation tank 26 while the existing water treatment system is in operation, and connecting the advanced-ozonation tank 26 immediately after the completion of installation to the existing water treatment system. A mixture of a residual ozonized gas accumulated in an upper space 16 in an ozonic water tank 2 and a residual ozonized gas not exhausted in the advanced-ozonation chamber 26 is supplied through an ozonized gas diffusing device 24 into the ozonation tank 25 for the preparatory treatment of the impure water prior to advanced-ozonation of the impure water. Therefore, the load on the advanced-ozonation tank 26 is reduced and hence the quantity of the ozonic water to be supplied to advanced-ozonation modules 18 can be reduced. Consequently, costs of ozone generation and water treatment can be reduced.

Seventh embodiment

A UV-assisted advanced-ozonation water treatment system in a seventh embodiment according to the present invention will be described with reference to FIG. 9, in which parts like or corresponding to those of the sixth embodiment shown in FIG. 8 are denoted by the same reference characters and the description thereof will be omitted.

Figure 9:
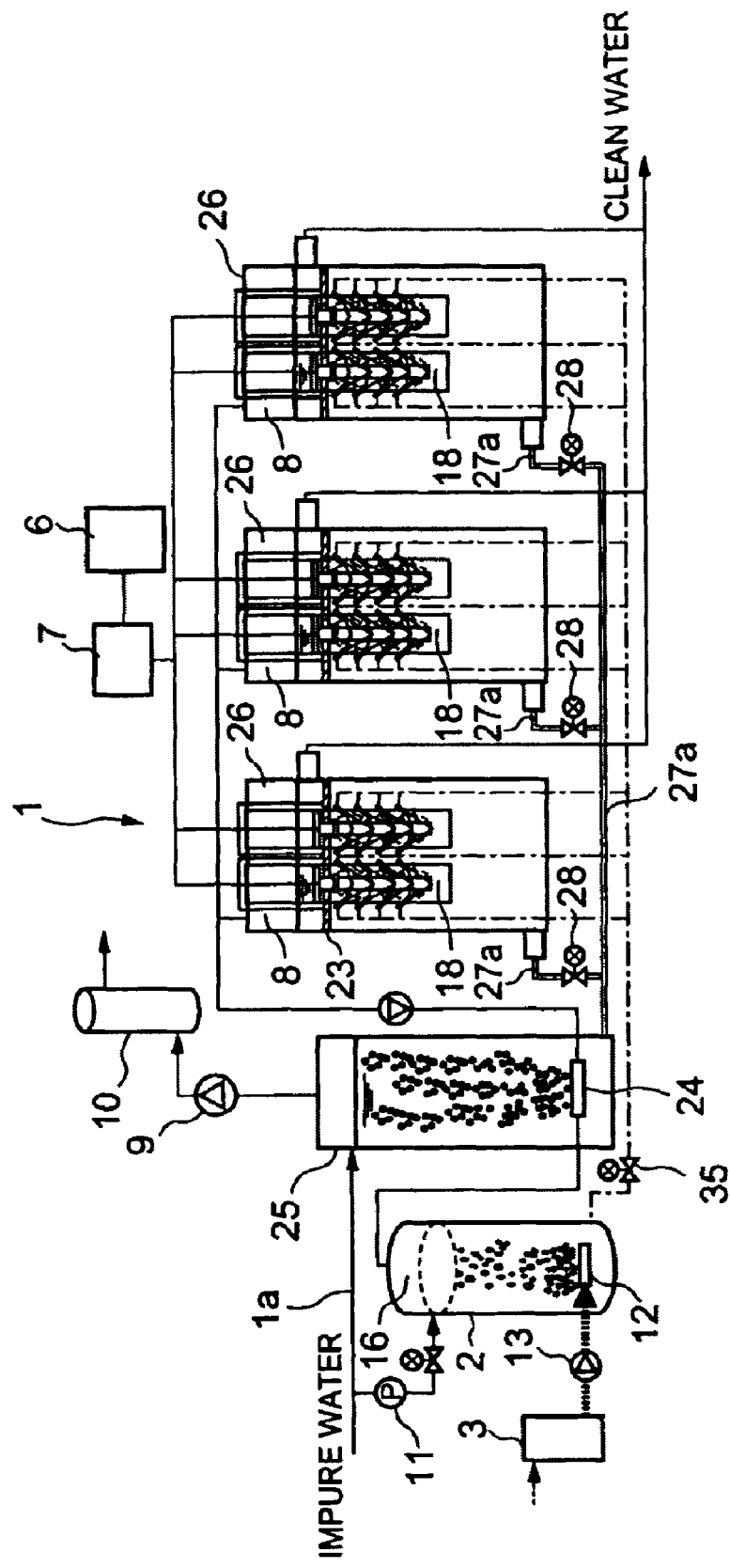
FIG. 9 is a diagrammatic view of a UV-assisted advanced-ozonation water treatment system in a seventh embodiment according to the present invention.

As shown in FIG. 9, the UV-assisted advanced-ozonation water treatment system in the seventh embodiment is provided with an ozonation tank 25 and three advanced-ozonation tanks 26. Advanced-ozonation modules 18 are disposed in the advanced-ozonation tanks 26. A connecting line 27 has branch lines 27a respectively provided with shutoff valves 28 and connecting the ozonation tank 25 to the advanced-ozonation tanks 26.

Since the ozonation tank 25 and the advanced-ozonation tanks 26 are installed separately, an existing water treatment system can easily be modified to construct a UV-assisted advanced-ozonation water treatment system by additionally installing the advanced-ozonation tanks 26 while the existing water treatment system is in operation, and connecting the advanced-ozonation tank 26 immediately after the completion of installation to the existing water treatment system. Since the advanced-ozonation tanks 26 are provided separately, a desired number of the three advanced-ozonation tanks 26 can be used according to the amount of impure water to be treated, so that the useless operation of the UV-assisted advanced-ozonation water treatment system can be avoided. If a trouble occurs in some of the three advanced-ozonation tanks 26, repair work can be carried out for the advanced-ozonation tank 26 by closing only the shutoff valve 28 placed in the branch line 27a connected to the relevant advanced-ozonation tank 26. Thus, the repair work can be carried out without stopping the operation of the UV-assisted advanced-ozonation water treatment system and hence stable water treatment can be achieved.

A mixture of a residual ozonized gas not dissolved in water in an ozonic water tank 2 and a residual ozonized gas not exhausted in the advanced-ozonation tanks 26 is supplied through an ozonized gas diffusing device 24 into the ozonation tank 25 for the preparatory treatment of the impure water prior to the advanced-ozonation of the impure water. Therefore, the quantity of the ozonic water to be supplied to advanced-ozonation modules 18 can be reduced. Consequently, costs of ozone generation and water treatment can be reduced.

Eighth Embodiment

A UV-assisted advanced-ozonation water treatment system in an eighth embodiment according to the present invention will be described with reference to FIG. 10, in which parts like or corresponding to those of the fifth embodiment shown in FIG. 7 are denoted by the same reference characters and the description thereof will be omitted.

Figure 10:
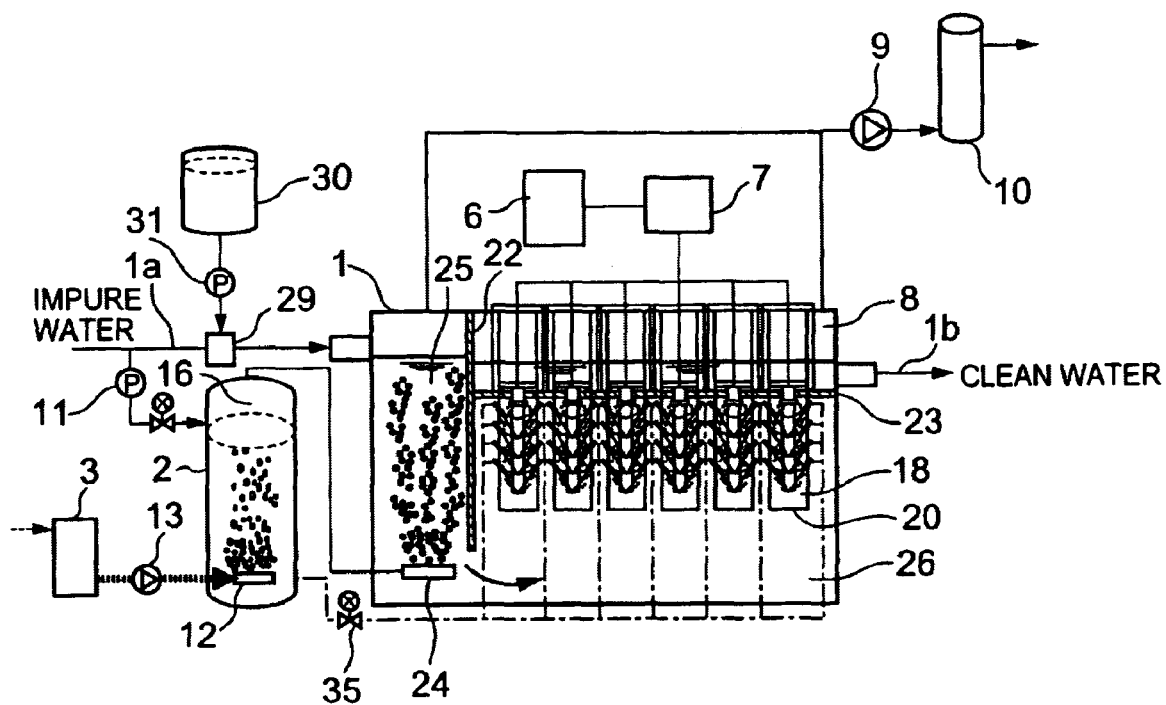
FIG. 10 is a diagrammatic view of a UV-assisted advanced-ozonation water treatment system in a eighth embodiment according to the present invention.

Referring to FIG. 10, a hydrogen peroxide injecting device 29 is connected to an impure water supply line 1 a connected to a water treating tank 1. A hydrogen peroxide pump 31 feeds hydrogen peroxide from a container 30 to the hydrogen peroxide injecting device 29. Hydrogen peroxide supplied by the hydrogen peroxide injecting device 29 connected to the impure water supply line 1a is mixed in impure water, and an ozonized gas is mixed in the impure water in the water treating tank 1. The interaction of the ozone contained in the ozonized gas and the hydrogen peroxide in the water treating tank 1 produces radical species having oxidizing power higher than that of ozone, such as OH radicals in the impure water through the following reactions.

$$O_3 + H_2O_2 \rightarrow OH + O_2 \text{ or}$$

$$H_2O_2 \rightarrow HO_2^- + H^-$$

$$O_3 + HO_2^- \rightarrow OH + O_2^- + O_2$$

The hydrogen peroxide needs to undergo a dissociative reaction in water to generate hydroperoxy ions ($HO_2^-$). Then the hydroperoxy ions react with ozone to generate OH radicals, which oxidize pollutants contained in the impure water efficiently. Since large quantities of OH radicals are generated by both the interaction of the hydroperoxy ions and the ozone and the reaction of ozonic water jetted onto UV lamps of advanced-ozonation modules disposed in the water treating tank 1 with UV light emitted by the UV lamps, a water purifying process can very efficiently be carried out.

Thus the UV-assisted advanced-ozonation water treatment system in the eighth embodiment according to the present invention is capable of decomposing pollutants contained in the impure water more efficiently than the conventional diffusion type UV-assisted advanced-ozonation water treatment system, and of efficiently purifying the impure water. Thus, the costs of ozone generation and water treatment can be reduced.

Ninth Embodiment

A UV-assisted advanced-ozonation water treatment system in a ninth embodiment according to the present invention will be described with reference to FIGS. 11 to 13, in which parts like or corresponding to those of the fifth embodiment shown in FIG. 7 are denoted by the same reference characters and the description thereof will be omitted.

Figure 11:
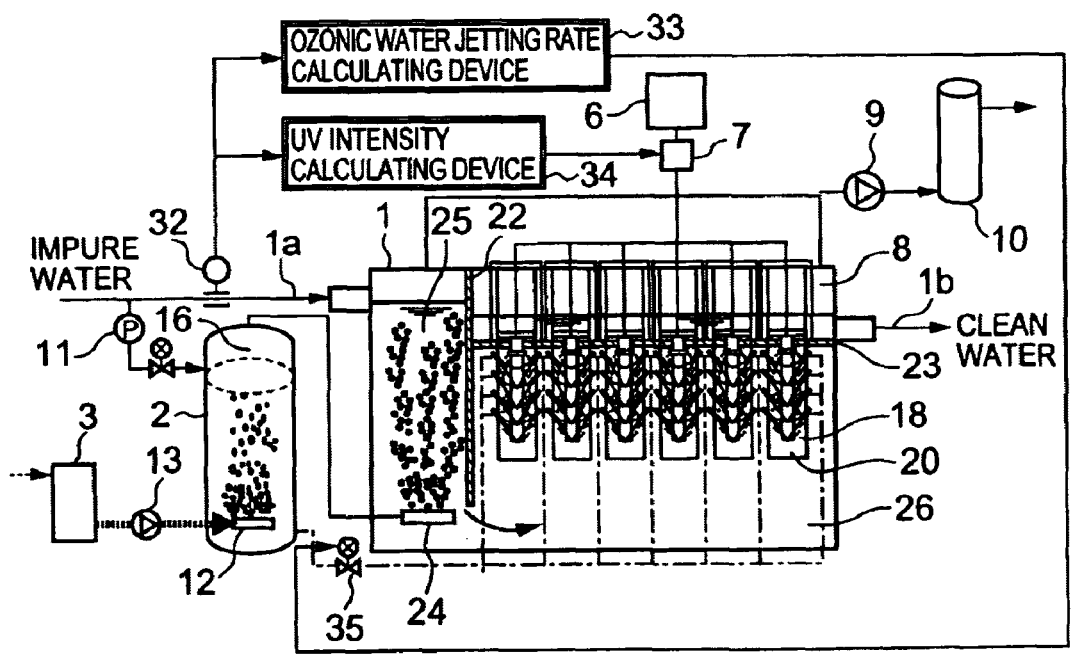
FIG. 11 is a diagrammatic view of a UV-assisted advanced-ozonation water treatment system in a ninth embodiment according to the present invention.
Figure 12:
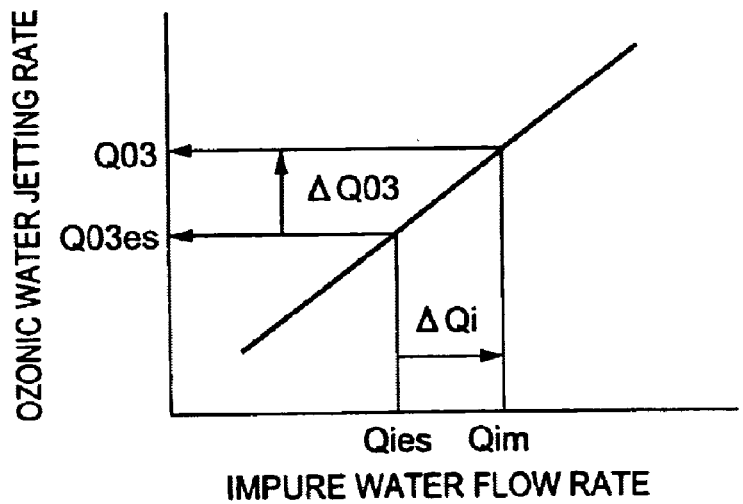
FIG. 12 is a graph showing the relation between impure water flow rate and optimum ozonic water jetting rate in the UV-assisted advanced-ozonation water treatment system shown in FIG. 11.

Referring to FIG. 11, an impure water flow meter 32 is placed in an impure water supply line 1a connected to a water treating tank 1. The impure water flow meter 32 sends a signal representing a measured flow rate to an ozonic water jetting rate calculating device 33 and a UV intensity calculating device 34. The ozonic water jetting rate calculating device 33 and the UV intensity calculating device 34 calculate an opening of an ozonic water flow regulating valve 35 for supplying the ozonic water from an ozonic water tank 2 to jetting nozzles 5, and power to be supplied by a UV lamp regulating device 7, respectively, on the basis of the difference between a reference flow rate and the measured flow rate to control the flow rate of the ozonic water and the intensity of UV light properly by a feed-forward control operation.

A feed-forward control system for carrying out the feed-forward control operation will be described. Referring to FIG. 12 showing the relation between impure water flow rate and optimum ozonic water flow rate, the ozonic water jetting rate calculating device 33 calculates an ozonic water flow rate correction $\Delta Q_{O3}$ corresponding to the difference $\Delta Q_i$ between a reference impure water flow rate $Q_{ies}$ and a measured impure water flow rate $Q_{im}$ measured by the impure water flow meter 32. The opening of the flow regulating valve 35 is changed so as to change the flow rate of the ozonic water by the calculated ozonic water flow rate correction $\Delta Q_{O3}$.

Figure 13:
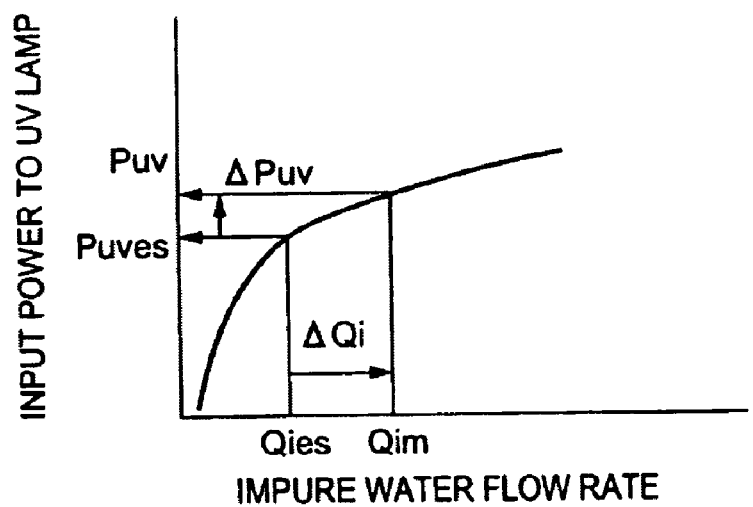
FIG. 13 is a graph showing the relation between impure water flow rate and optimum power supplied to UV lamps in the UV-assisted advanced-ozonation water treatment system shown in FIG. 11.

Referring to FIG. 13 showing the relation between impure water flow rate and optimum power supplied to the UV lamps, the UV intensity calculating device 34 calculates an input power correction $\Delta P_{uv}$ corresponding to the difference $\Delta Q_i$ between the reference impure water flow rate $Q_{ies}$ and the measured impure water flow rate $Q_{im}$ measured by the impure water flow meter 32. The UV lamp regulating device 7 is controlled so as to change the power supplied to the UV lamps by the calculated input power correction $\Delta P_{uv}$.

The UV-assisted advanced-ozonation water treatment system in the ninth embodiment monitors the flow rate of the impure water, and adjusts the flow rate of the ozonic water and/or the intensity of UV radiation radiated by the UV lamps properly according to the variation of the flow rate of the impure water. Thus, the flow rate of the ozonic water and/or the intensity of UV radiation radiated by the UV lamps can properly be controlled and thereby reliability of impure water treatment can be ensured. Moreover, useless power consumption by the ozonized gas generator and the UV light source can be prevented and hence energy efficiency can be improved. Thus, the costs of ozone generation and water treatment can be reduced.

Tenth Embodiment

A UV-assisted advanced-ozonation water treatment system in a tenth embodiment according to the present invention will be described with reference to FIGS. 14 to 17, in which parts like or corresponding to those of the ninth embodiment shown in FIG. 11 are denoted by the same reference characters and the description thereof will be omitted.

Figure 14:
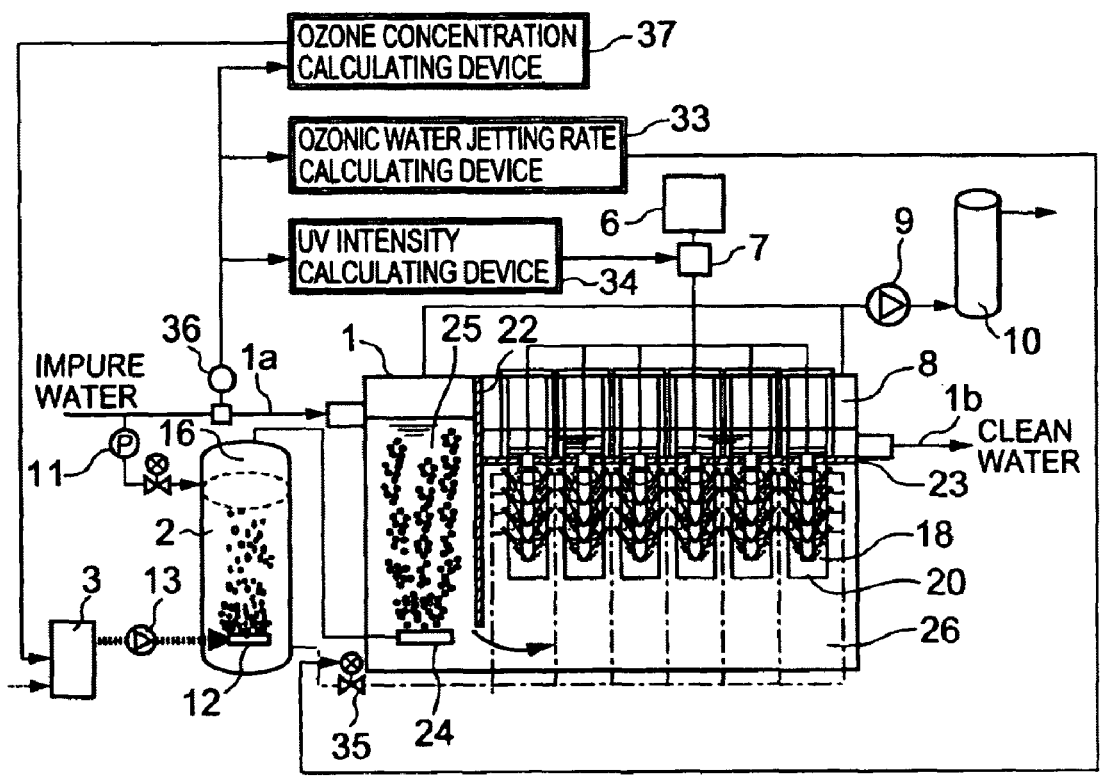
FIG. 14 is a diagrammatic view of a UV-assisted advanced-ozonation water treatment system in a tenth embodiment according to the present invention.

Referring to FIG. 14, a UV transmittance measuring device 36 is placed in an impure water supply line 1a. The UV transmittance measuring device 36 is capable of directly or indirectly measuring the UV transmittance of impure water flowing through the impure water supply line 1a. The UV transmittance measuring device 36 sends a signal representing a measured UV transmittance to an ozonic water jetting rate calculating device 33, a UV intensity calculating device 34 and an ozone concentration calculating device 37. The ozonic water jetting rate calculating device 33, the UV intensity calculating device 34 and the ozone concentration calculating device 37 calculate an opening of an ozonic water flow regulating valve 35 for supplying the ozonic water from an ozonic water tank 2 to jetting nozzles 5, power to be supplied by a UV lamp regulating device 7 and an ozone concentration of an ozonized gas generated by an ozonized gas generator 3, respectively, on the basis of the difference between a reference UV transmittance and a measured UV transmittance to control the flow rate of the ozonic water, the intensity of UV light and the ozone concentration of the ozonized gas properly by a feed-forward control operation.

Figure 15:
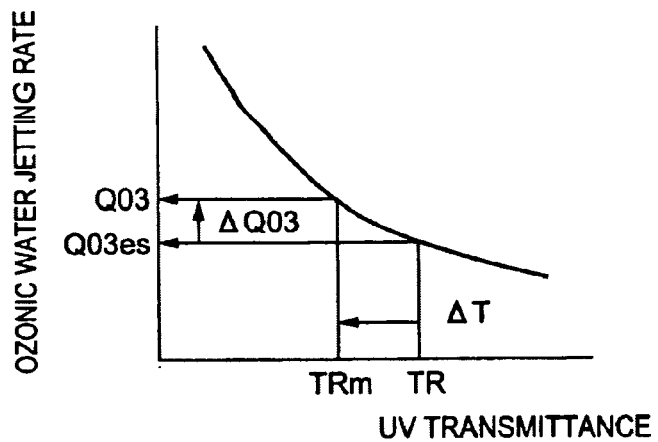
FIG. 15 is a graph showing the relation between UV transmittance and optimum ozonic water flow rate in the UV-assisted advanced-ozonation water treatment system shown in FIG. 14.

A feed-forward control system for carrying out the feed-forward control operation will be described. Referring to FIG. 15 showing the relation between UV transmittance and optimum ozonic water flow rate, the ozonic water jetting rate calculating device 33 calculates an ozonic water flow rate correction $\Delta Q_{O3}$ corresponding to the difference $\Delta TR$ between a reference UV transmittance $TR_{es}$ and a measured UV transmittance $TR_m$ measured by the UV transmittance measuring device 36. The opening of the flow regulating valve 35 is changed so as to change the flow rate of the ozonic water by the calculated ozonic water flow rate correction $\Delta Q_{O3}$.

Figure 16:
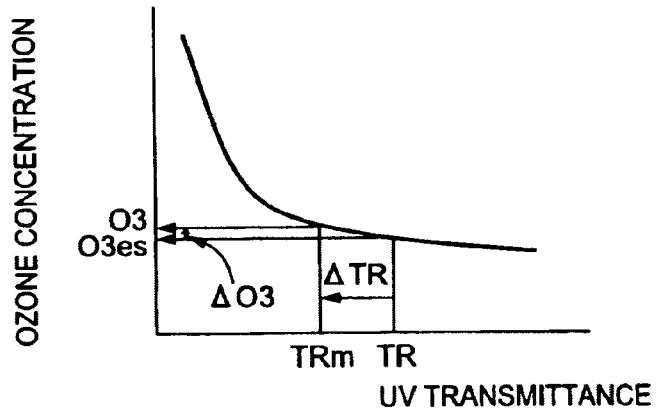
FIG. 16 is a graph showing the relation between the UV transmittance of impure water to be treated by the UV-assisted advanced-ozonation water treatment system shown in FIG. 14 and optimum ozone concentration.

Referring to FIG. 16 showing the relation between UV transmittance and optimum ozone concentration, the ozone concentration calculating device 37 calculates an ozone concentration correction $\Delta O_3$ corresponding to the UV transmittance difference $\Delta TR$ between a reference UV transmittance $TR_{es}$ and a measured UV transmittance $TR_m$ measured by the UV transmittance measuring device 36. The ozonized gas generator 3 is controlled so as to change the ozone concentration of the ozonized gas by the ozone concentration difference $\Delta O_3$.

Figure 17:
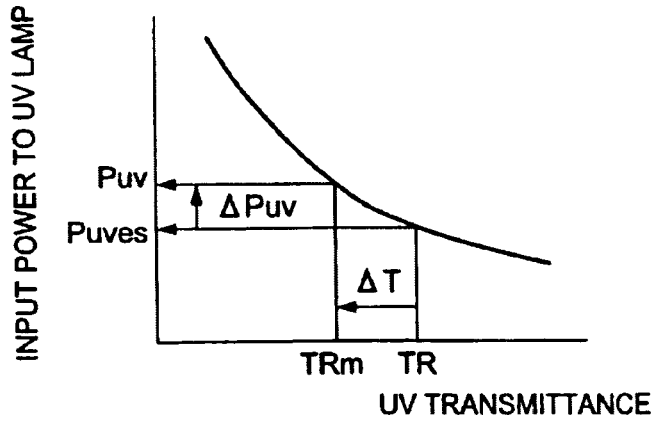
FIG. 17 is a graph showing the relation between the UV transmittance of impure water to be treated by the UV-assisted advanced-ozonation water treatment system shown in FIG. 14 and optimum UV lamp input power.

Referring to FIG. 17 showing the relation between UV transmittance and optimum power supplied to the UV lamps, the UV intensity calculating device 34 calculates an input power correction $\Delta P_{uv}$ corresponding to the UV transmittance difference $\Delta TR$ between a reference UV transmittance $TR_{es}$ and a measured UV transmittance $TR_m$ measured by the UV transmittance measuring device 36. The UV lamp regulating device 7 is controlled so as to change the power supplied to the UV lamps by the calculated input power correction $\Delta P_{uv}$ by a feed-forward control operation.

The feed-forward control system may control only either the opening of the ozonic water flow regulating valve 35 or the ozone concentration of the ozonized gas generated by the ozonized gas generator 3. The UV transmittance measuring device 36 is a UV sensor capable of directly or indirectly measuring the UV transmittance of the impure water, such as a UV transmissometer, a UV absorbance meter, a turbidity meter or a color meter. An optimum UV sensor may be used taking into consideration accuracy and maintainability of the sensor.

The UV-assisted advanced-ozonation water treatment system in the tenth embodiment monitors the UV transmittance of the impure water. When the measured UV transmittance drops below the reference UV transmittance, the intensity of UV radiation radiated by UV light sources 4 is increased to maintain an effective UV-irradiated range in the advanced-ozonation module 18, the flow rate of the ozonic water is increased to increase the generation of radical species by increasing the ozone concentration in the vicinity of the UV-radiating surfaces 4a and the stirring force of the ozonized gas for stirring the impure water in the advanced-ozonation module 18 is increased by increasing the flow rate of the ozonic water to be jetted through the jetting nozzles 5. Thus, the reduction of the processing ability due to the reduction of the effective UV-irradiated range can be prevented.

When the measured UV transmittance measured by the UV transmittance measuring device 36 rises beyond the reference UV transmittance, the intensity of UV radiation radiated by the UV light sources 4 is reduced to maintain the effective UV-irradiated range in the advanced-ozonation module 18. Since the production of necessary radical species can be maintained even if the flow rate of the ozonic water is reduced because the effective UV-irradiated range expands, useless power consumption by the UV light sources 4 and the ozonized gas generator 3 can be prevented. The rate of changing the intensity of UV radiation and the rate of changing ozonic water jetting rate are determined according to the difference between the reference UV transmittance and the measured UV transmittance of the impure water such that the sum of the respective power consumptions of the UV light sources 4 and the ozonized gas generator 3 is a minimum. Thus the optimum control of the flow rate of the ozonic water and the intensity of the UV radiation is achieved, reliable water treatment is possible, useless power consumption by the ozonized gas generator 3 and the UV light sources 4 is prevented, and energy efficiency can be improved.

Eleventh Embodiment

A UV-assisted advanced-ozonation water treatment system in an eleventh embodiment according to the present invention will be described with reference to FIGS. 18 to 21, in which parts like or corresponding to those of the ninth embodiment shown in FIG. 14 are denoted by the same reference characters and the description thereof will be omitted.

Figure 18:
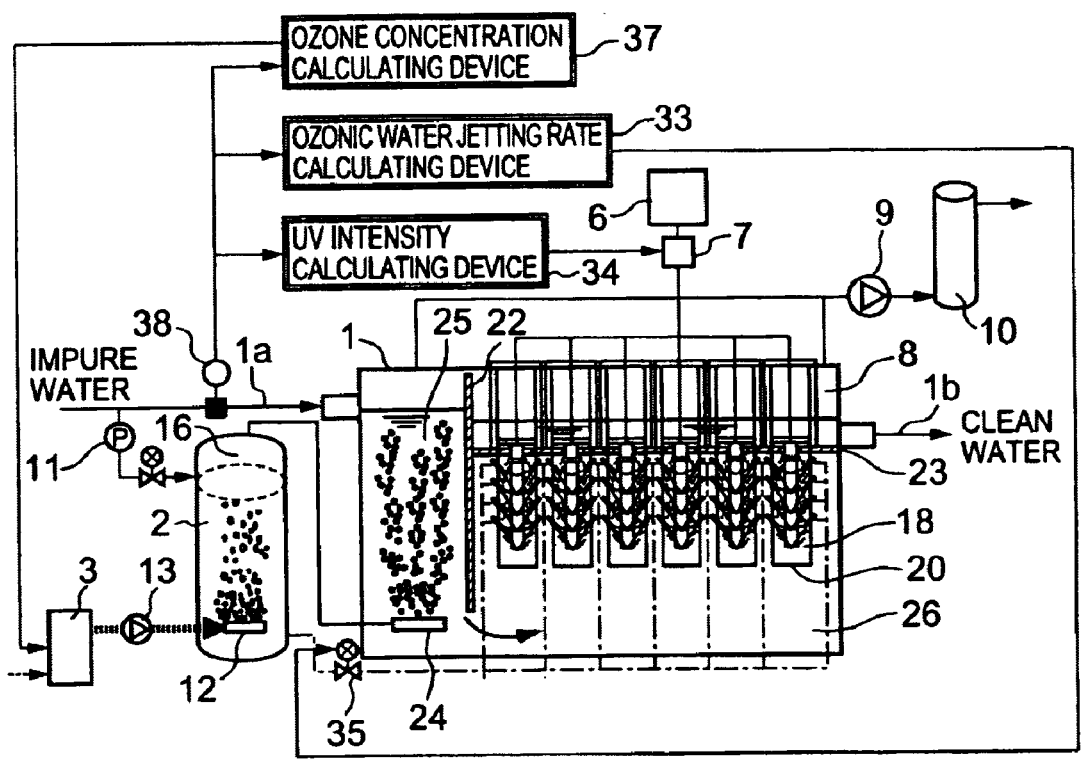
FIG. 18 is a diagrammatic view of a UV-assisted advanced-ozonation water treatment system in an eleventh embodiment according to the present invention

Referring to FIG. 18, an impure water quality measuring device 38 is-placed in an impure water supply line 1a. The impure water quality measuring device 38 is capable of directly or indirectly measuring the quality of impure water flowing through the impure water supply line 1a. The impure water quality measuring device 38 sends a signal representing a measured quality of the impure water to an ozonic water jetting rate calculating device 33, a UV intensity calculating device 34 and an ozone concentration calculating device 37. The ozonic water jetting rate calculating device 33, the UV intensity calculating device 34 and the ozone concentration calculating device 37 calculate an opening of an ozonic water flow regulating valve 35 for supplying the ozonic water from an ozonic water tank 2 to jetting nozzles 5, power to be supplied by a UV lamp regulating device 7 and an ozone concentration of an ozonized gas generated by an ozonized gas generator 3, respectively, on the basis of the difference between a reference impure water quality and a measured impure water quality to control the flow rate of the ozonic water, the intensity of UV light and the ozone concentration of the ozonized gas properly by a feed-forward control operation.

A feed-forward control system for carrying out the feed-forward control operation will be described. The impure water quality measuring device 38 is a sensor capable of directly or indirectly measuring the pollutant concentration of the impure water. When pollutants to be decomposed are difficult-to-decompose organic substances, a fluorescence intensity analyzer, a UV absorbance meter, a TOC meter or a COD meter is used as the impure water quality measuring device 38. An optimum sensor suitable for desired measurement may be used.

Figure 19:
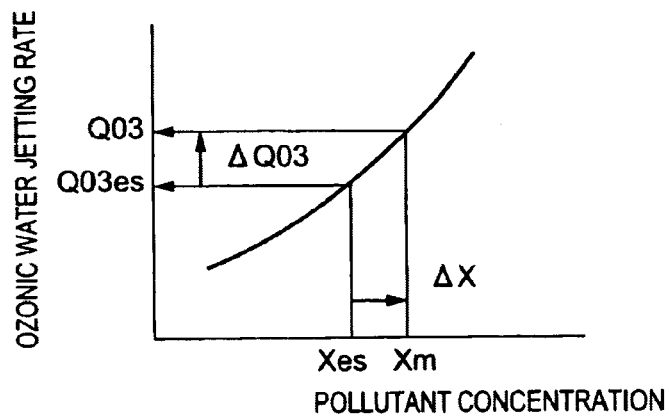
FIG. 19 is a graph showing the relation between the pollutant concentration of impure water to be treated by the UV-assisted advanced-ozonation water treatment system shown in FIG. 18 and optimum ozonic water flow rate.

Referring to FIG. 19 showing the relation between a measured pollutant concentration and optimum ozonic water flow rate, the ozonic water jetting rate calculating device 33 calculates an ozonic water flow rate correction $\Delta Q_{O3}$ corresponding to the difference $\Delta X$ between a reference pollutant concentration $X_{es}$ and a measured pollutant concentration $X_m$ measured by the impure water quality measuring device 38. The opening of the flow regulating valve 35 is changed so as to change the flow rate of the ozonic water by the calculated ozonic water flow rate correction $\Delta Q_{O3}$.

Figure 20:
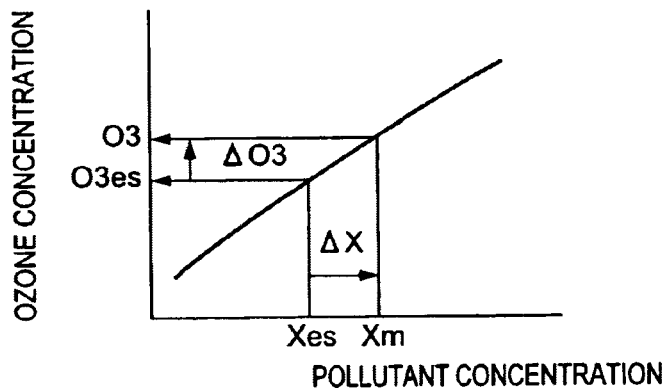
FIG. 20 is a graph showing the relation between the pollutant concentration of impure water to be treated by the UV-assisted advanced-ozonation water treatment system shown in FIG. 18 and optimum ozone concentration.

Referring to FIG. 20 showing the relation between pollutant concentration and optimum ozone concentration, the ozone concentration calculating device 37 calculates an ozone concentration correction $\Delta O_3$ corresponding to the pollutant concentration difference $\Delta X$ between a reference pollutant concentration $X_{es}$ and a measured pollutant concentration $X_m$ measured by the impure water quality measuring device 38. Power supplied to the ozonized gas generator 3 is changed by a power corresponding to the ozone concentration difference $\Delta O_3$.

Figure 21:
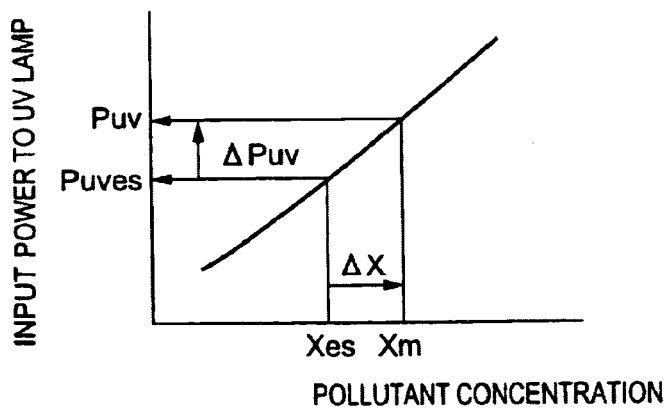
FIG. 21 is a graph showing the relation between the pollutant concentration of impure water to be treated by the UV-assisted advanced-ozonation water treatment system shown in FIG. 18 and optimum UV lamp input power.

Referring to FIG. 21 showing the relation between pollutant concentration and optimum power supplied to the UV lamps, the UV intensity calculating device 34 calculates an input power correction $\Delta P_{uv}$ corresponding to the pollutant concentration difference $\Delta X$ between a reference pollutant concentration $X_{es}$ and a measured pollutant concentration $X_m$ measured by the impure water quality measuring device 38. A UV lamp regulating device 7 is controlled so as to change the power supplied to the UV lamps by the calculated input power correction $\Delta P_{uv}$.

The feed-forward control system may control only either the opening of the ozonic water flow regulating valve 35 or the ozone concentration of the ozonized gas generated by the ozonized gas generator 3.

The UV-assisted advanced-ozonation water treatment system in the eleventh embodiment monitors the pollutant concentration of the impure water. When the measured pollutant concentration drops below the reference pollutant concentration, the intensity of UV radiation radiated by UV light sources 4 is reduced to reduce an effective UV-irradiated range in the advanced-ozonation module 18, and the flow rate of the ozonic water is reduced to reduce the generation of radical species by reducing the ozone concentration in the vicinity of the UV-radiating surfaces 4a. Thus, useless power consumption by the UV light sources 4 and the ozonized gas generator 3 due to the reduction of water quality load can be prevented.

When the measured pollutant concentration measured by the impure water quality measuring device 38 rises beyond the reference pollutant concentration, the intensity of UV radiation radiated by the UV light sources 4 is increased to maintain/expand the effective UV-irradiated range in the advanced-ozonation module 18. The reduction of the water treating ability due to the increase of the water quality load can be prevented by increasing the flow rate of the ozonic water to increase the production of radical species by increasing ozone concentration in the vicinity of the UV-radiating surfaces 4a, and to increase the stirring force of the ozonic water for stirring the impure water in the water treating tank by increasing the intensity of jets of the ozonic water jetted through the jetting nozzles 5. The rate of changing the intensity of UV radiation and the rate of changing ozonic water jetting rate are determined according to the difference between the reference pollutant concentration and the measured pollutant concentration of the impure water such that the sum of the respective power consumptions of the UV light sources 4 and the ozonized gas generator 3 is a minimum. Thus the optimum control of the flow rate of the ozonic water and the intensity of the UV radiation is achieved, reliable water treatment is possible, useless power consumption by the ozonized gas generator 3 and the UV light sources 4 is prevented, and energy efficiency can be improved.

Twelfth Embodiment

A UV-assisted advanced-ozonation water treatment system in a twelfth embodiment according to the present invention will be described with reference to FIG. 22, in which parts like or corresponding to those of the eleventh embodiment shown in FIG. 18 are denoted by the same reference characters and the description thereof will be omitted.

Figure 22:
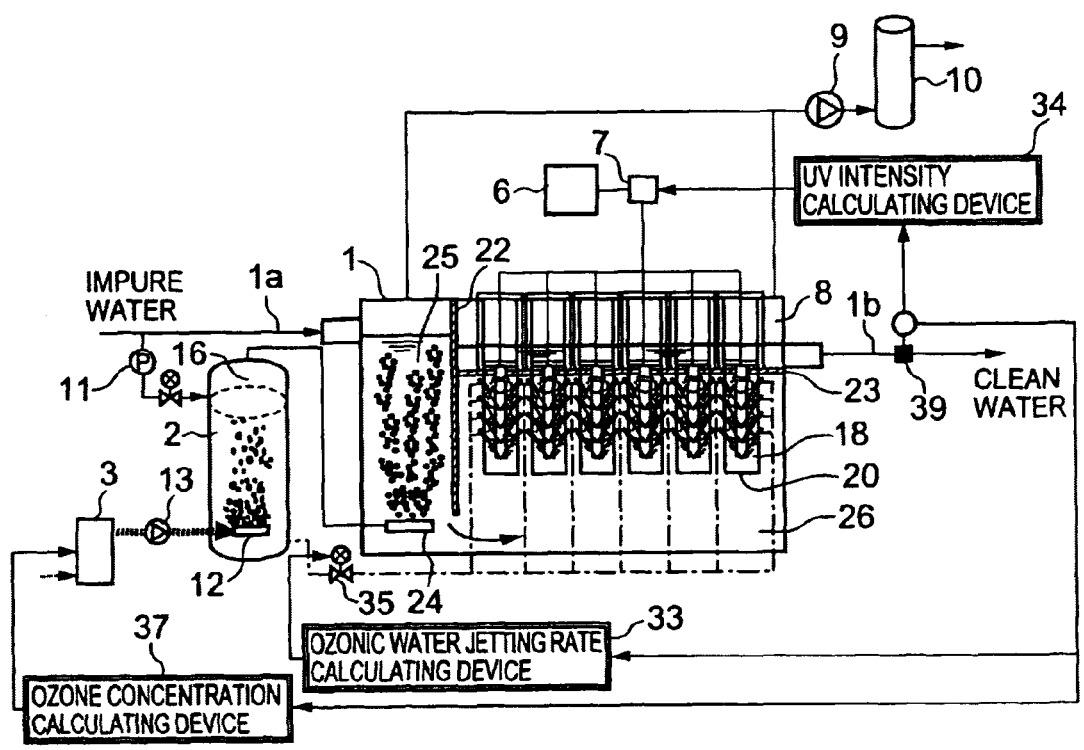
FIG. 22 is a diagrammatic view of a UV-assisted advanced-ozonation water treatment system in a twelfth embodiment according to the present invention.

Referring to FIG. 22, a clean water quality measuring device 39 is placed in a clean water carrying line 1b connected to a water treating tank 1. The clean water quality measuring device 39 is capable of directly or indirectly measuring the quality of clean water. The clean water quality measuring device 39 sends a signal representing a measured quality of the clean water to an ozonic water jetting rate calculating device 33, a UV intensity calculating device 34 and an ozone concentration calculating device 37. The ozonic water jetting rate calculating device 33, the UV intensity calculating device 34 and the ozone concentration calculating device 37 calculate an opening of an ozonic water flow regulating valve 35 for supplying the ozonic water from an ozonic water tank 2 to jetting nozzles 5, power to be supplied by a UV lamp regulating device 7 and an ozone concentration of an ozonized gas generated by an ozonized gas generator 3, respectively, on the basis of the difference between a reference clean water quality and a measured clean water quality to control the flow rate of the ozonic water, the intensity of UV light and the ozone concentration of the ozonized gas properly by a feed-forward control operation.

A feed-forward control system for carrying out the feed-forward control operation will be described. The clean water quality measuring device 39 is a sensor capable of directly or indirectly measuring the pollutant concentration of the clean water. When pollutants to be decomposed are difficult-to-decompose organic substances, a fluorescence sensor, a UV absorbance meter, a TOC meter or a COD meter is used as the clean water quality measuring device 39. An optimum sensor suitable for desired measurement may be used. The feed-forward control system may control only either the opening of the ozonic water flow regulating valve 35 or the ozone concentration of the ozonized gas generated by the ozonized gas generator 3.

The UV-assisted advanced-ozonation water treatment system in the twelfth embodiment monitors the pollutant concentration of the clean water. When a measured pollutant concentration measured by the clean water quality measuring device 39 drops below the reference pollutant concentration, the intensity of UV radiation radiated by UV light sourced 4 is reduced to reduce an effective UV-irradiated range in an advanced-ozonation module 18. The flow rate of the ozonic water is reduced to reduce the generation of radical species by reducing the ozone concentration in the vicinity of UV-radiating surfaces 4a to prevent useless power consumption by the UV light sources 4 and the ozonized gas generator 3 due to the reduction of water quality load placed by the impure water.

When the measured pollutant concentration measured by the clean water quality measuring device 39 rises beyond the reference pollutant concentration, the intensity of UV radiation radiated by the UV light sources 4 is increased to maintain/expand the effective UV-irradiated range in the advanced-ozonation module 18. The reduction of the water treating ability due to the increase of the water quality load can be prevented by increasing the flow rate of the ozonic water to increase the production of radical species by increasing ozone concentration in the vicinity of the UV-radiating surfaces 4a, and to increase the stirring force of the ozonic water for stirring the impure water in the water treating tank by increasing the intensity of jets of the ozonic water jetted through the jetting nozzles 5. The rate of changing the intensity of UV radiation and the rate of changing ozonic water jetting rate are determined according to the difference between the reference pollutant concentration and the measured pollutant concentration of the clean water such that the sum of the respective power consumptions of the UV light sources 4 and the ozonized gas generator 3 is a minimum. Thus the optimum control of the flow rate of the ozonic water and the intensity of the UV radiation is achieved according to the degree of pollution of the impure water, reliable water treatment is possible, useless power consumption by the ozonized gas generator 3 and the UV light sources 4 is prevented, and energy efficiency can be improved.

Thirteenth Embodiment

A UV-assisted advanced-ozonation water treatment system in a thirteenth embodiment according to the present invention will be described with reference to FIG. 23, in which parts like or corresponding to those of the twelfth embodiment shown in FIG. 22 are denoted by the same reference characters and the description thereof will be omitted.

Figure 23:
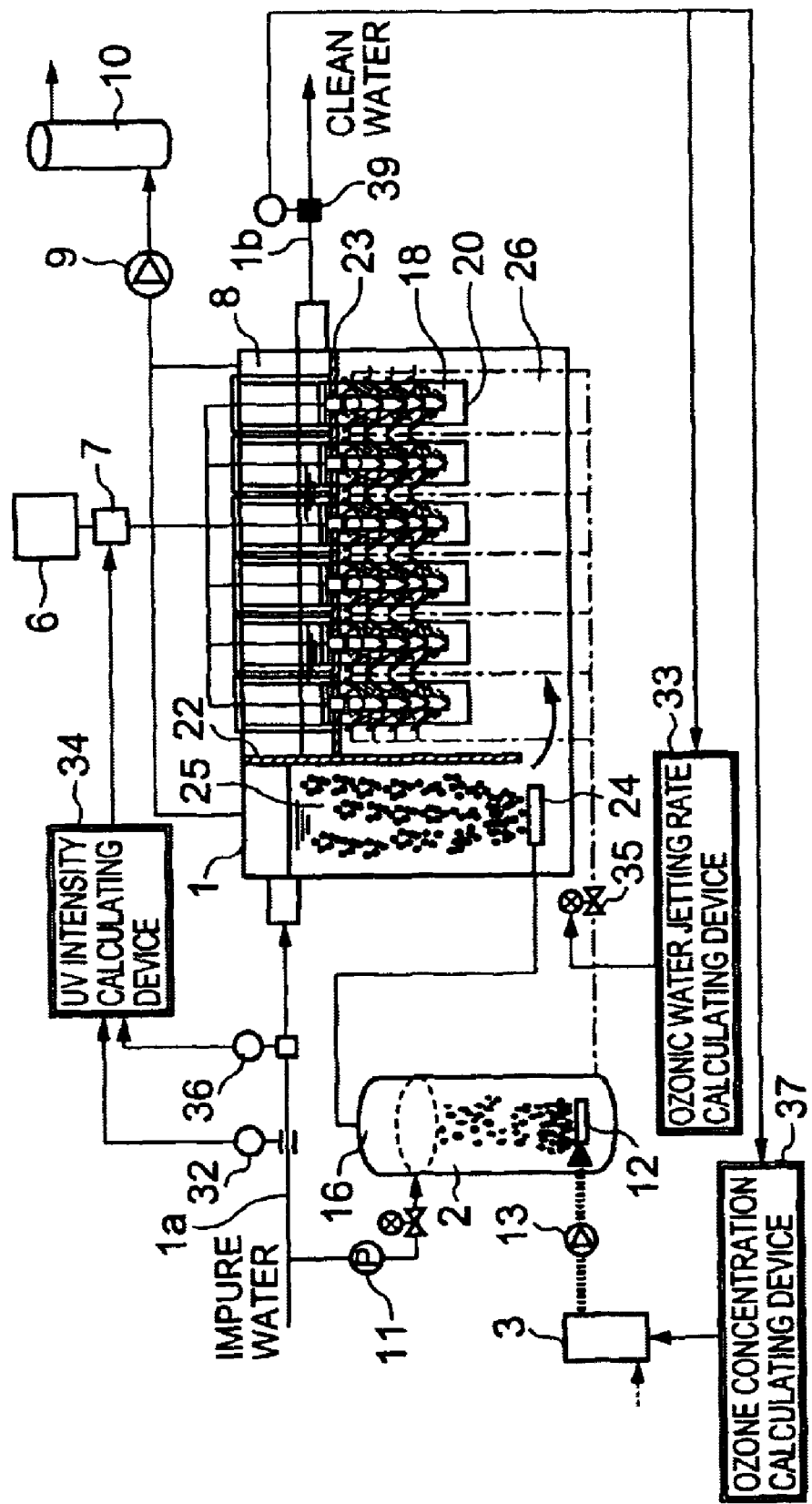
FIG. 23 is a diagrammatic view of a UV-assisted advanced-ozonation water treatment system in a thirteenth embodiment according to the present invention.

Referring to FIG. 23, an impure water flow meter 32 and a UV transmittance measuring device 36 are placed in an impure water supply line 1a. The impure water flow meter 32 and the UV transmittance measuring device 36 send signals respectively representing a measured impure water flow rate and a UV transmittance to a UV intensity calculating device 34. The UV intensity calculating device 34 calculates values for controlling the opening of an ozonic water flow regulating valve 35 and the ozone concentration of an ozonized gas generated by an ozonized gas generator 3 and to be supplied into an ozonic water tank 2 on the basis of the differences between measured values and reference values corresponding to the measured values to control the ozonic water flow regulating valve 35 and the ozonized gas generator 3 by a feed-forward control operation. The feed-forward control operation may control only either the opening of the ozonic water flow regulating valve 35 or the ozone concentration of the ozonized gas generated by the ozonized gas generator 3.

Thus, effective UV intensity and UV-irradiated range in an advanced-ozonation module 18 can be adjusted to the most effective values according to the respective variations of impure water flow rate and UV transmittance, and the efficiency of utilization of UV light sources 4 can be improved. Since the rate of jetting the ozonic water onto UV-radiating surfaces 4a or the ozone concentration of the ozonized gas is controlled on the basis of measured pollutant concentration of the impure water, the quantity of radical species can be adjusted by adjusting the supply of ozone into the vicinity of the UV-radiating surfaces 4a when water treating ability is excessive or insufficient. Thus, the water treating ability can quickly be adjusted to a moderate level. Thus, safe, reliable water treatment can be achieved, useless power consumption by the ozonized gas generator 3 and the UV light sources 4 can be prevented and energy efficiency can be improved.

Fourteenth Embodiment

A UV-assisted advanced-ozonation water treatment system in a fourteenth embodiment according to the present invention will be described with reference to FIG. 24, in which parts like or corresponding to those of the twelfth embodiment shown in FIG. 22 are denoted by the same reference characters and the description thereof will be omitted.

Figure 24:
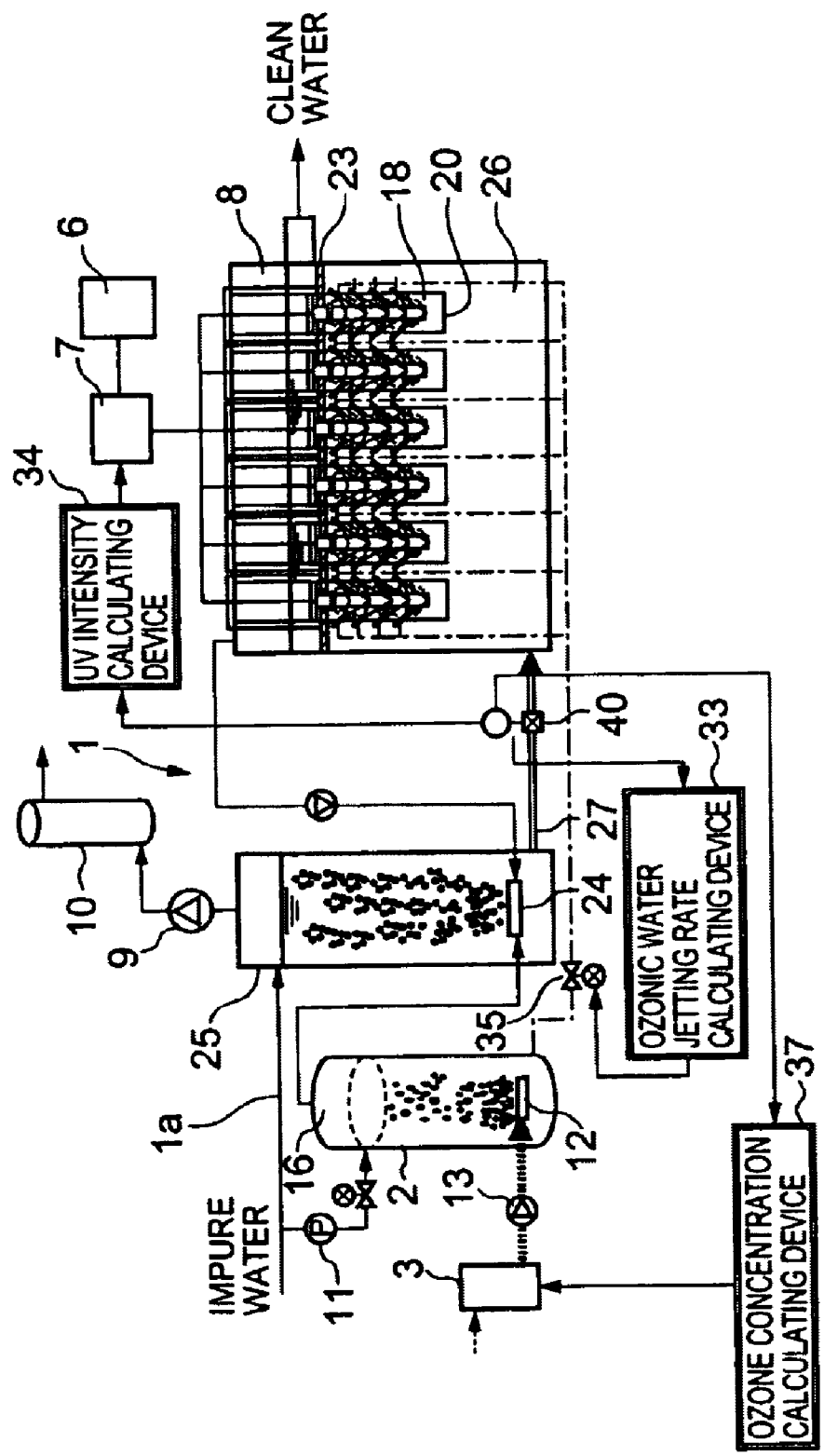
FIG. 24 is a diagrammatic view of a UV-assisted advanced-ozonation water treatment system in a fourteenth embodiment according to the present invention.

Referring to FIG. 24, a water treating tank 1 consists of an ozonizing tank 25 and an advanced ozonation tank 26 connected to the outlet of the ozonizing tank 25 by a connecting line 27. An ozone concentration meter 40 for measuring the ozone concentration of ozonic water is placed in the connecting line 27. The ozone concentration meter 40 sends a signal representing an ozone concentration to an ozonic water jetting rate calculating device 33, a UV intensity calculating device 34 and an ozone concentration calculating device 37. The ozonic water jetting rate calculating device 33, the UV intensity calculating device 34 and the ozone concentration calculating device 37 calculate corrections for correcting the opening of an ozonic water flow regulating valve 35 through which ozonic water is supplied from an ozonic water tank 2 to jetting nozzles 5, power to be supplied to a UV lamp regulating device 7, and the ozone concentration of an ozonized gas generated by an ozonized gas generator 3 and to be injected into the ozonic water tank 2, respectively, on the basis of the difference between a reference impure water quality and a measured impure water quality measured by an impure water quality measuring device 39. Thus, the opening of the ozonic water flow regulating valve 35, the power supplied to the UV lamp regulating device 7 and the ozone concentration of the ozonized gas are adjusted properly according to the quality of the impure water by a feed-forward control operation. The feed-forward control operation may control only either the opening of the ozonic water flow regulating valve 35 or the ozone concentration of the ozonized gas generated by the ozonized gas generator 3.

Thus, the ozonic water jetting rate at which the ozonic water is jetted onto UV-radiating surfaces 4a or the ozone concentration of the ozonic water can be controlled according to the initial ozone concentration of the impure water supplied into the advanced-ozonation tank 26 by measuring the ozone concentration of the impure water by the ozone concentration meter 40, and the UV lamp regulating device 7 can be controlled so as to adjust the intensity of UV radiation properly according to the ozonic water jetting rate or the ozone concentration of the ozonized gas. Thus, the ozonized gas is used effectively to reduce the amount of discharged ozone. Consequently, useless power consumption of by the ozonized gas generator 3 and UV light sources 4 can be prevented, energy efficiency can be improved and safe, reliable water treatment can be achieved.

Fifteenth Embodiment

A UV-assisted advanced-ozonation water treatment system in a fifteenth embodiment according to the present invention will be described with reference to FIG. 25, in which parts like or corresponding to those of the eighth embodiment shown in FIG. 10 are denoted by the same reference characters and the description thereof will be omitted.

Figure 25:
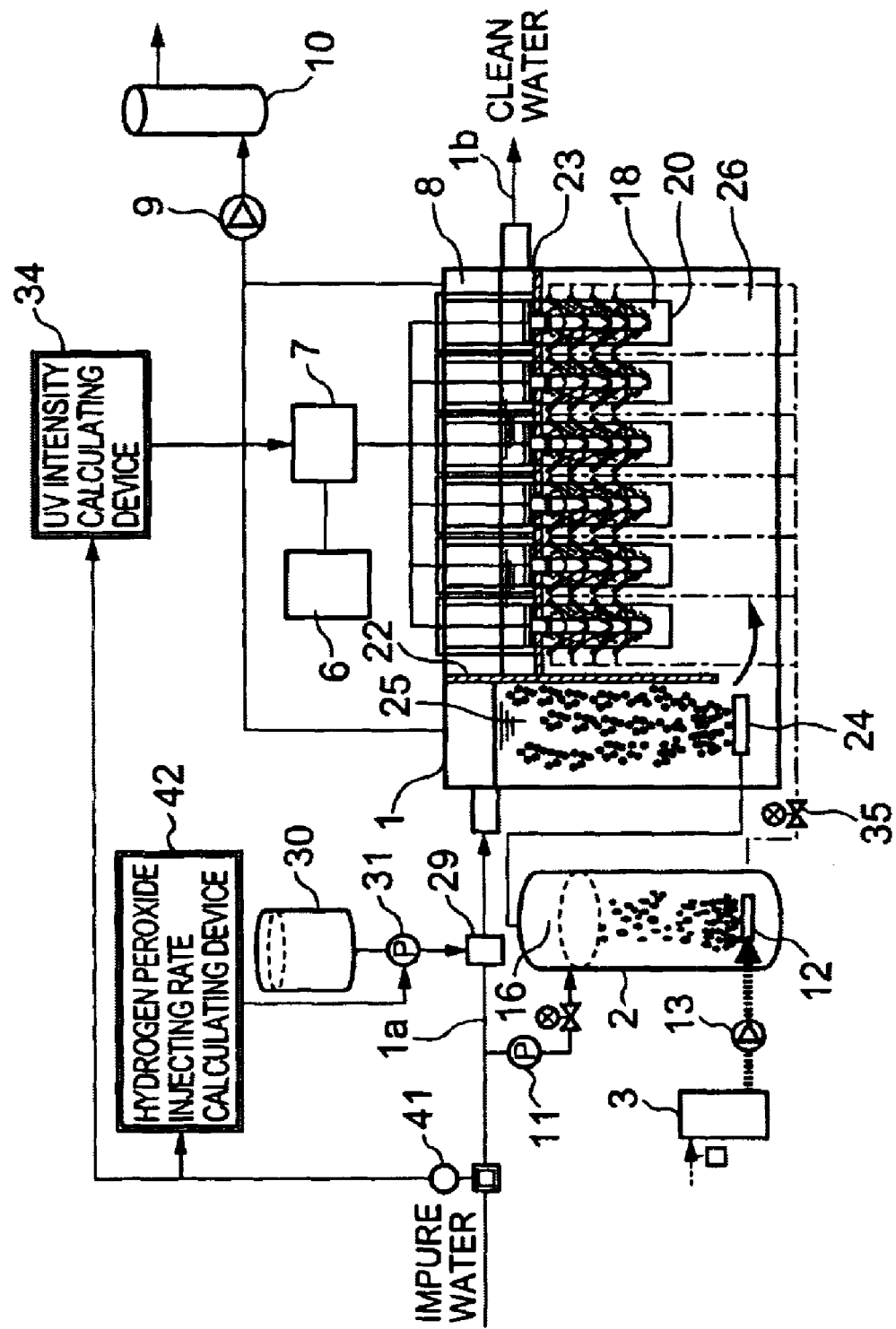
FIG. 25 is a diagrammatic view of a UV-assisted advanced-ozonation water treatment system in a fifteenth embodiment according to the present invention.

Referring to FIG. 25, a hydrogen peroxide injecting device 29 and a bromide ion concentration measuring device 41 are connected to an impure water supply line 1a connected to a water treating tank 1. The bromide ion concentration measuring device 41 is on the upper side of the hydrogen peroxide injecting device 29. The bromide ion concentration measuring device 41 measures the bromide ion concentration of impure water directly or indirectly. The bromide ion concentration measuring device 41 sends a signal representing a bromide ion concentration of the impure water to a hydrogen peroxide injecting rate calculating device 42 and a UV intensity calculating device 34. The hydrogen peroxide injecting rate calculating device 42 and the UV intensity calculating device 34 calculate power corrections for correcting values of power supplied to a hydrogen peroxide feed pump 31 and a UV lamp regulating device 7 on the basis of the difference between a reference bromide ion concentration and a measured bromide ion concentration measured by the bromide ion concentration measuring device 41. Pump 31 feeds hydrogen peroxide from container 30. The values of power supplied to the hydrogen peroxide feed pump 31 and the UV lamp regulating device 7 are adjusted by using the corrections by a feed-forward operation.

A feed-forward control system for carrying out the feed-forward control operation will be described. When the measured bromide ion concentration rises beyond the reference bromide ion concentration, the hydrogen peroxide feed pump 31 is controlled so as to increase hydrogen peroxide injecting rate according to the difference between the reference and the measured bromide ion concentration, and a UV lamp regulating device 7 is controlled so as to reduce the intensity of UV radiation radiated by UV light sources 4 according to the difference between the reference and the measured bromide ion concentration.

When the measured bromide ion concentration drops below the reference bromide ion concentration, the hydrogen peroxide feed pump 31 is controlled so as to reduce hydrogen peroxide injecting rate according to the difference between the reference and the measured bromide ion concentration, and the UV lamp regulating device 7 is controlled so as to increase the intensity of UV radiation radiated by the UV light sources 4 according to the difference between the reference and the measured bromide ion concentration.

Figure 26:
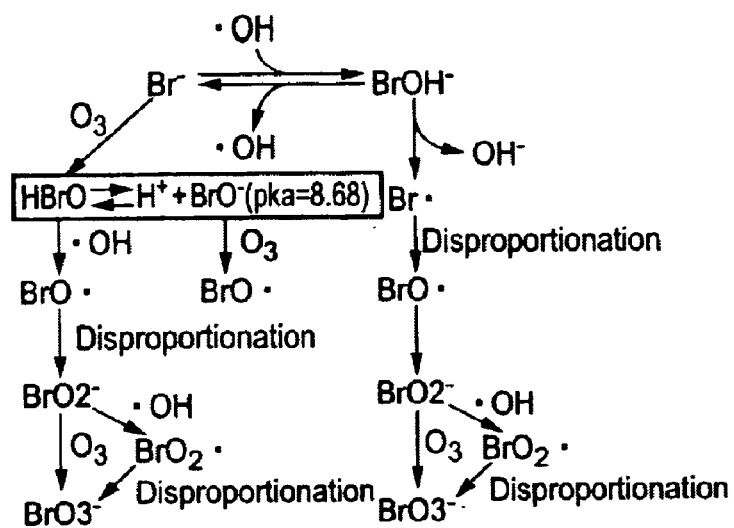
FIG. 26 is a diagram of assistance in explaining a process of generation of bromic acid from dissolved ozone and bromide ions.
Figure 27:
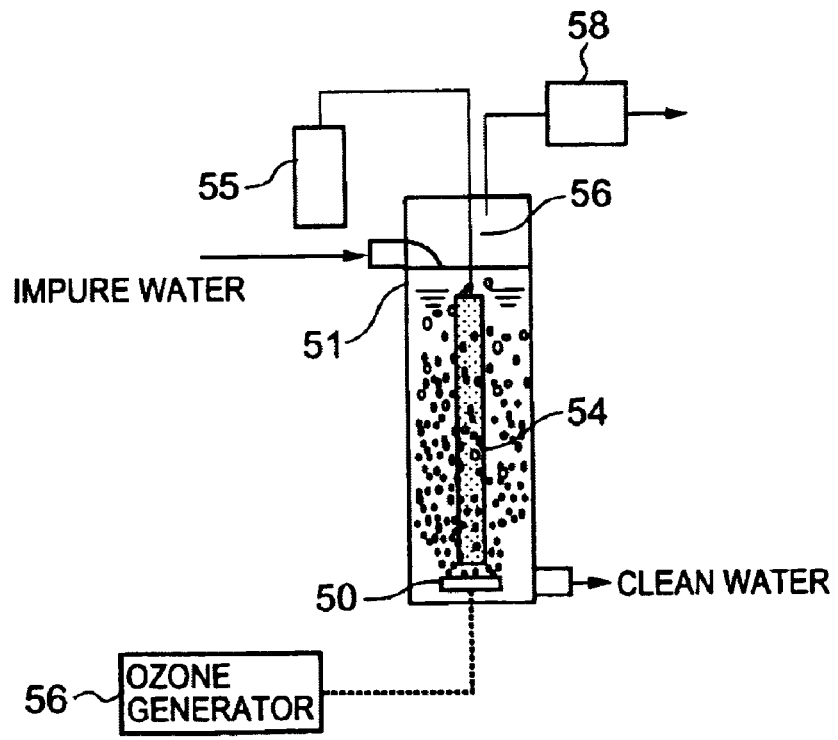
FIG. 27 is a diagrammatic view of a conventional UV-assisted advanced-oxidation water treatment system.

The rate of generation of bromic acid, which is a carcinogenic substance, increases by a bromic acid generating process shown in FIG. 26 when the bromide ion concentration of the impure water increases because ozone and OH radicals remain in the impure water when the impure water is treated only by an advanced-ozonation treatment using ozone and UV radiation. The generation of bromic acid can be suppressed by reducing ozone dissolved in the impure water by an advanced-ozonation process principally using ozone and hydrogen peroxide. High processing performance can be exhibited by using UV radiation as a complementary processing means even if the intensity of UV radiation is reduced and thereby useless power consumption of UV light sources 4 can be prevented.

The risk of generation of bromic acid decreases with the decrease of the bromide ion concentration of the impure water. Then, the excessive injection of hydrogen peroxide into the impure water can be prevented. The generation of bromic acid can be suppressed by an advanced-ozonation process principally using ozone and UV radiation. Consequently, improper use of hydrogen peroxide can be prevented, useless power consumption by the UV light sources 4 can be prevented, and safe, reliable water treatment can be achieved.

As apparent from the foregoing description, according to the present invention, pollutants contained in impure water can be decomposed at a high decomposing efficiency, the UV-radiating surfaces are scarcely contaminated, and the life of the UV light sources is extended significantly, and a water treatment operation suited to the degree and state of pollution can be carried out. Thus, energy-efficient, safe, reliable water treatment can be achieved.

What is claimed is:

1. A UV-assisted advanced-ozonation water treatment system comprising:

a water treating tank having a water inlet connected to a water supply line for supplying water to be treated;

an ozonic water tank for producing ozonic water;

an ozonized gas generator for supplying an ozonized gas into the ozonic water tank;

a UV light source disposed in the water treating tank and having a UV-radiating surface; and an ozonic water jetting device for jetting the ozonic water supplied from the ozonic water tank onto the UV-radiating surface of the UV light source.

2. The UV-assisted advanced-ozonation water treatment system according to claim 1, wherein the ozonic water jetting device includes jetting nozzles, and the ozonic water supplied from the ozonic water tank is jetted through the jetting nozzles onto the UV-radiating surface.

3. The UV-assisted advanced-ozonation water treatment system according to claim 1, wherein a water supply pipe having an open bottom is disposed in the water treating tank, the water to be treated is supplied into the water supply pipe through an upper part thereof, and the UV light source and the ozonic water jetting device are disposed in the water supply pipe.

4. The UV-assisted advanced-ozonation water treatment system according to claim 1, wherein an ozonized gas diffusing device is disposed in a lower part of the water treating tank, residual ozonized gas not dissolved in water and accumulated in an upper part of the ozonic water tank is supplied into the ozonized gas diffusing device and is diffused into the water treating tank.

5. A UV-assisted advanced-ozonation water treatment system comprising:

a water treating tank having a water inlet connected to a water supply line for supplying water to be treated;

an ozonic water tank for producing ozonic water;

an ozonized gas generator for supplying an ozonized gas into the ozonic water tank; and advanced-ozonation modules disposed in the water treating tank, each including a cylindrical jacket with a side wall defining a substantially straight passage extending upward from a lower part of the water treating tank, a UV light source disposed in the cylindrical jacket and having a UV-radiating surface, and an ozonic water jetting device penetrating the side wall of the cylindrical jacket;

wherein ozonic water is supplied from the ozonic water tank into the ozonic water jetting devices, and the ozonic water jetting devices jet the ozonic water onto the UV-radiating surfaces of the UV light source.

6. The UV-assisted advanced-ozonation water treatment system according to claim 5, wherein interior of the water treating tank is divided into an ozonation chamber and an advanced-ozonation chamber by a partition plate, the water to be treated is supplied into an upper part of the ozonation chamber, an ozonized gas diffusing device is disposed in a lower part of the ozonation chamber, the advanced-ozonation modules are disposed in the advanced-ozonation chamber, a residual ozonized gas not dissolved in water and accumulated in an upper part of the ozonic water tank or an ozonized gas remaining in an upper part of the advanced-ozonation chamber, or both are supplied into the ozonized gas diffusing device to diffuse the ozonized gas into the ozonation chamber.

7. The UV-assisted advanced-ozonation water treatment system according to claim 5, wherein the water treating tank is formed by connecting an ozonation tank and an advanced-ozonation tank by a connecting pipe, the water to be treated is supplied into an upper part of the ozonation tank, an ozonized gas diffusing device is disposed in a lower part of the ozonation tank, the advanced-ozonation modules are disposed in the advanced-ozonation tank, a residual ozonized gas not dissolved in water and accumulated in an upper part of the ozonic water tank or an ozonized gas accumulated in an upper part of the advanced-ozonation tank, or both are supplied into the ozonized gas diffusing device to diffuse the ozonized gas into the ozonation tank.

8. The UV-assisted advanced-ozonation water treatment system according to claim 7, wherein the advanced-ozonation tank includes a plurality of advanced-ozonation tanks, the advanced-ozonation modules are disposed in each of the advanced-ozonation tanks, the plurality of advanced-ozonation tanks are connected to the ozonation tank by connecting pipes, respectively, and the connecting pipes are provided with shutoff valves, respectively.

9. The UV-assisted advanced-ozonation water treatment system according to claim 1 or 5, wherein a hydrogen peroxide injecting device is connected to the water supply line connected to the water inlet of the water treating tank.

10. The UV-assisted advanced-ozonation water treatment system according to claim 1 or 5 further comprising:

a flow meter placed in the water supply line connected to the water inlet of the water treating tank; and an arithmetic unit that controls flow rate of the ozonic water flowing from the ozonic water tank into the ozonic water jetting device, and intensity of UV light radiated by the UV light source according to a difference between a reference flow rate and a measured flow rate measured by the flow meter.

11. The UV-assisted advanced-ozonation water treatment system according to claim 1 or 5 further comprising:

a UV transmittance measuring means connected to the water supply line connected to the water inlet to measure UV transmittance of the water to be treated; and an arithmetic unit that controls flow rate of the ozonic water flowing from the ozonic water tank into the ozonic water jetting device or ozone concentration of the ozonized gas generated from the ozonized gas generator, or both, and the intensity of ultraviolet radiation radiated by the UV light source, according to difference between a reference UV transmittance and a measured UV transmittance measured by the UV transmittance measuring means.

12. The UV-assisted advanced-ozonation water treatment system according to claim 1 or 5 further comprising:

a water quality measuring means placed in the water supply line connected to the water inlet to measure quality of the water to be treated; and an arithmetic unit that controls flow rate of the ozonic water flowing from the ozonic water tank into the ozonic water jetting device or ozone concentration of the ozonized gas generated by the ozonized gas generator, or both, and intensity of UV radiation radiated by the UV light source according to difference between a reference water quality and a measured water quality measured by the impure water quality measuring means.

13. The UV-assisted advanced-ozonation water treatment system according to claim 1 or 5 further comprising:

a clean water quality measuring means placed in a clean water carrying line connected to a water outlet of the water treating tank to measure quality of purified clean water; and an arithmetic unit that controls flow rate of the ozonic water flowing from the ozonic water tank into the ozonic water jetting device or ozone concentration of the ozonized gas generated by the ozonized gas generator, or both, and intensity of UV radiation radiated by the UV light source according to difference between a reference water quality and a measured clean water quality measured by the clean water quality measuring means.

14. The UV-assisted advanced-ozonation water treatment system according to claim 1 or 5 further comprising:

a flow meter placed in the water supply line connected to the water inlet of the water treating tank;

a UV transmittance measuring means placed in the water supply line connected to the water inlet of the water treating tank;

a clean water quality measuring means for measuring quality of purified clean water placed in a clean water carrying line connected to a water outlet of the water treating tank; and an arithmetic unit that controls intensity of UV radiation radiated by the UV light source according to difference between a reference flow rate and a measured flow rate measured by the flow meter and difference between a reference UV transmittance and a measured UV transmittance measured by the UV transmission measuring device, and controls flow rate of the ozonic water flowing from the ozonic water tank into the ozonic water jetting device or ozone concentration of the ozonized gas generated by the ozonized gas generator, or both according to the difference between a reference clean water quality and a measured clean water quality measured by the clean water quality measuring means.

15. The UV-assisted advanced-ozonation water treatment system according to claim 1 or 5 further comprising:

a dissolved-ozone concentration meter placed in the water treating tank; and an arithmetic unit that controls flow rate of the ozonic water flowing from the ozonic water tank into the ozonic water jetting device or ozone concentration of the ozonized gas generated by the ozonized gas generator, or both according to difference between a reference dissolved-ozone concentration and a measured dissolved-ozone concentration measured by the dissolved-ozone concentration meter, and adjusts the intensity of UV radiation radiated by the UV light source to a predetermined value.

16. The UV-assisted advanced-ozonation water treatment system according to claim 9 further comprising:

a bromide ion concentration measuring means for directly or indirectly measuring bromide ion concentration placed in the impure water supply line on an upper side of the hydrogen peroxide injecting device; and an arithmetic unit that increases hydrogen peroxide injecting rate and reduces intensity of UV radiation radiated by the UV light source according to a difference between a reference bromide concentration and a measured bromide ion concentration measured by the bromide ion concentration measuring means when the measured bromide ion concentration rises beyond the reference bromide ion concentration, and reduces hydrogen peroxide injecting rate and increases intensity of UV radiation radiated by the UV light source according to difference between a reference bromide ion concentration and a measured bromide ion concentration when the measured bromide ion concentration drops below the reference bromide ion concentration.

17. An advanced-ozonation module comprising:

a cylindrical jacket defining a substantially straight passage;

a UV light source having a UV-radiating wall having a UV-radiating surface; and an ozonic water jetting device including jetting nozzles penetrating a side wall of the cylindrical jacket.

\* \* \* \* \*